United States Patent [19]

Takato et al.

[11] Patent Number: 4,827,505

[45] Date of Patent: May 2, 1989

[54] SUBSCRIBER LINE INTERFACE CIRCUIT

[75] Inventors: Kenji Takato; Toshiro Tojo, both of Kawasaki; Yozo Iketani, Yokohama; Mitsutoshi Ayano, Tokyo; Kiyoshi Shibuya, Kawasaki, all of Japan

[73] Assignee: Fujitsu Limited, Kawasaki, Japan

[21] Appl. No.: 897,914

[22] Filed: Aug. 19, 1986

[30] Foreign Application Priority Data

| Aug. 20, 1985 | [JP] | Japan | 60-180960 |
| Aug. 20, 1985 | [JP] | Japan | 60-180956 |
| Aug. 20, 1985 | [JP] | Japan | 60-180957 |
| Aug. 20, 1985 | [JP] | Japan | 60-180958 |
| Aug. 20, 1985 | [JP] | Japan | 60-180959 |

[51] Int. Cl.$^4$ ................ H04M 19/00; H04M 3/22
[52] U.S. Cl. .................... 379/413; 379/385; 379/377; 379/399
[58] Field of Search ........... 379/345, 322, 395, 324, 379/405, 348, 399, 413, 412; 307/296 R, 297; 323/315, 316; 330/256, 257, 288

[56] References Cited

U.S. PATENT DOCUMENTS

| 4,203,012 | 5/1980 | Boxall | 379/405 |
| 4,300,023 | 11/1981 | Kelley et al. | 379/405 |
| 4,314,196 | 2/1982 | Brown | 323/315 |
| 4,431,874 | 2/1984 | Zobel et al. | 379/405 |
| 4,447,675 | 5/1984 | Arntsen et al. | |

FOREIGN PATENT DOCUMENTS

| 2535568 | 5/0484 | France . | |
| 0104558 | 6/1983 | Japan | 379/395 |
| 2065420 | 6/1981 | United Kingdom . | |

OTHER PUBLICATIONS

Electronic Design, vol. 28, no. 20, Sep. 27, 1980, pp. 84–91, L. Brown et al. "One chip closes in on SLIC functions".

Pace, W. David, "A Monolithic Telephone Subscriber Loop Interface Circuit", IEEE Journal of Solid-State Circuits, vol. SC-16, No. 4, Aug. 1981, pp. 270–278.

*Primary Examiner*—Jin F. Ng
*Assistant Examiner*—Randall S. Vaas
*Attorney, Agent, or Firm*—Staas & Halsey

[57] ABSTRACT

A subscriber line interface circuit receives and twice inverts currents from a 2-wire subscriber line and returns the currents to the subscriber line so longitudinal input impedance is low. Any differential input current in the subscriber lines is bypassed by a capacitor, so differential input impedance is very high. The circuit also sends a signal current from one system having one ground to another system having a different ground through one current path, while sending another current, having a phase opposite and amplitude equal to the signal current, through another path. This effectively isolates the two systems having different grounds.

22 Claims, 17 Drawing Sheets

FIG. 2 (a)   PRIOR ART
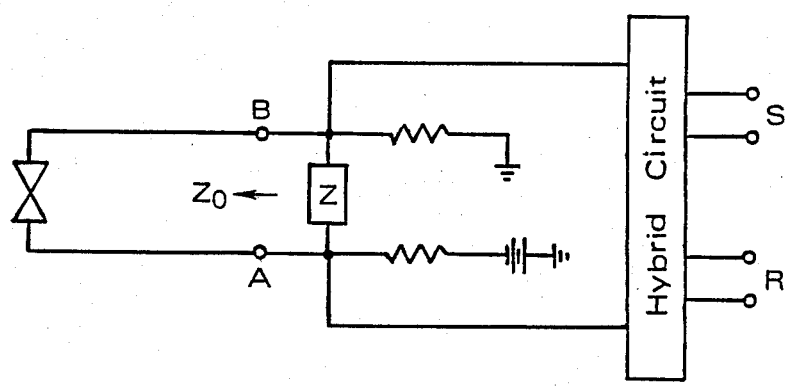
FIG. 2 (b)   PRIOR ART
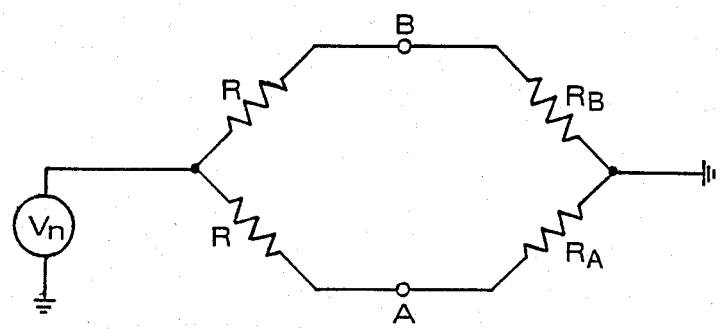

SYSTEM E      SYSTEM G

SUBSCRIBER LINE INTERFACE CIRCUIT

BACKGROUND OF THE INVENTION

1. Field of the Invention

The present invention relates to a subscriber line interface circuit for a telephone terminal station having a digital switching system. Especially it relates to a battery feed circuit, a hybrid circuit and a supervision circuit for fabrication in monolithic ICs (integrated circuits) to miniaturize their size and to reduce their fabrication cost.

2. Description of Related Art

A subscriber line interface circuit for a telephone station is generally composed of seven fundamental circuits as shown in FIG. 1. Namely, a battery feed circuit for providing DC power for subscriber lines, a hybrid circuit for converting the telephone signal from 2-wire signal to 4-wire signal or vice versa, overvoltage protection circuit, ringing switch circuit for handling a ringing signal, CODEC (coding and decoding circuit) for telephone code, supervision circuit for supervising the operation of the circuit and test access relay circuit. All of them are provided respectively for each subscriber. Therefore, it is very important to reduce their size, power consumption and cost.

First, the CODEC has been fabricated in monolithic IC and is now in wide use, because the voltage applied to it is low (about 5 volts) and it was easy to realize in an IC. Attempts to fabricate the remaining circuits in an IC are beginning to be applied in practice. These efforts are directed to design ICs for the battery feed circuits, the 2- to 4-wire converter and the supervision circuit. The reason for selecting these circuits is that they deal with a medium voltage of 40–60 volts, while the remaining circuits deal with several hundreds volts or high current to be handled by relays.

The subscriber line interface circuit can be considered as equivalent to a circuit as shown in FIG. 2(a). To the terminals A and B are connected subscriber equipment having an impedance $Z_0$ which includes the impedances of the subscriber line and telephone equipment, for example. The subscriber line interface circuit (abbreviated as SLIC hereinafter) is provided with an AC termination impedance Z that terminates the subscriber line, and a battery feed circuit that supplies a DC voltage to one subscriber line, A for example, and the other subscriber line B is grounded through a feeding resistance. A telephone signal from the subscriber is taken out from the terminals A and B via a hybrid circuit converting a 2-wire signal to a 4-wire signal. Therefore, the internal impedance of the battery feed circuit must be as high as possible for the telephone signal which appears in a differential mode having a phase difference between the lines A and B. But in order to prevent noise generated in the subscriber line, the internal impedance for the noise should be as small as possible. Noise is usually generated on the subscriber line in a longitudinal mode that has the same phase in the lines A and B. So, the internal impedance of the battery feed circuit is preferably as low as possible for the longitudinal mode signal, but it should be as high as possible for differential mode signal.

To realize such internal impedance, various circuits have been proposed. But they can be reduced to an equivalent circuit as shown in FIG. 2(b) for the longitudinal noise voltage. The equivalent circuit is a bridge circuit having two resistances R corresponding to the lines A and B respectively, and internal resistance $R_A$ and $R_B$ of battery sources for lines A and B respectively. The noise voltage Vn is applied to a junction point of the two resistances R in equal phase for both of the lines. Therefore, two main approaches have appeared in the design of SLICs to eliminate the noise voltage between the terms A and B. One approach is balancing the bridge circuit, that is to make $$R_A/R = R_B/R,$$

the other is to make $R_A$ and $R_B$ as small as possible compared to R. The former is called a balanced type, and the latter is called a non-balanced type SLIC.

"A Monolithic Telephone Subscriber Loop Interface Circuit" by W. David Pace, IEEE Journal of Solid State Circuit, Aug. 1981, discloses fundamentals of monolithic IC circuits for the non-balanced type SLIC.

The following Japanese Laid Open Patents: Tokkai 55-150658; 56-141655; 57-25766; 57-38053; 58-104559 disclose balanced type battery feed circuits; Tokkai 58-210775; 59-161172 disclose non-balanced type battery feed circuits; and Tokkai 57-42263 discloses an IC circuit for the 2-to 4-wire converter.

The non-balanced type battery feed circuit has been more easily realized in a monolithic IC. It is important to make an equivalent value of the resistances $R_A$ and $R_B$ as small as possible. Using mirror circuits and feedback circuits, the equivalent value of $R_A$ and $R_B$ have been reduced to less than 1 ohm, and a longitudinal balance of 45 dB has been attained, when the circuit is trimmed. But the larger the longitudinal balance the better.

In order to attain higher longitudinal balance, it is necessary to balance the bridge circuit of the equivalent circuit of FIG. 2(b). This is the balanced type circuit. But in prior art circuits, it was necessary to use discrete components such as capacitors, power transistors and so on, which are difficult to fabricate in a monolithic IC. Moreover, the balance was liable to be disturbed by the variation of subscriber line impedance, supply voltage, signal level and so on, and when the balance was disturbed the circuit suffered from noise, so a precise adjustment of the balance is necessary.

SUMMARY OF THE INVENTION

A general object of the present invention therefore is to fabricate a main part of an SLIC in a monolithic IC to reduce its size, power consumption and cost.

Another object of the present invention is to provide a combined circuit of a battery feed circuit, a 2- to 4-wire converting hybrid circuit and a supervision circuit, which can be fabricated mostly in a monolithic IC.

Further object of the present invention is to provide a balanced type SLIC which is easily adjusted and can be realized mostly in a monolithic IC.

The present invention includes a battery feed circuit, an over current limiting circuit, a hybrid circuit for converting 2- to 4-wire line and vice versa and a supervision circuit. Most portions of these circuits can be produced in a monolithic IC.

The invention concerns a subscriber line interface circuit having a battery feed circuit for supplying DC current to a two-wire subscriber line having first and second terminals. The subscriber line interface circuit comprises: first and second current feed mirror circuits, respectively connected to the first and second terminals; a pair of voltage to current converting means, respectively connected to the first and second terminals; first and second mirror circuits operatively connected to the first and second terminals, respectively; a capacitor operatively connected between output terminals of the first and second mirror circuits; first and second resistors, each having a first end operatively connected to the capacitor and to the second and first mirror circuits, respectively; and third and fourth mirror circuits having input terminals operatively connected to second ends of the first and second resistors, and having output terminals operatively connected to input terminals of the second and first current feed mirror circuits, respectively.

These and other objects and advantages of the invention will become apparent from the following detailed description taken in conjunction with the accompanying drawings.

BRIEF DESCRIPTION OF DRAWINGS

FIG. 2(a) is a block diagram illustrating an impedance relationship between an SLIC and a subscriber's equipment;

FIG. 2(b) is an equivalent circuit of an SLIC for noise voltage induced on a subscriber line;

FIGS. 9(a)-9(d) are circuit diagrams for various types of mirror circuits applicable to the present invention, wherein:

FIG. 9(a) is a circuit symbol of a mirror circuit;

FIG. 9(b) is a fundamental circuit of a mirror circuit;

FIG. 9(c) is another example of a mirror circuit; and

FIG. 9(d) is a mirror circuit having two outputs;

DESCRIPTION OF THE PREFERRED EMBODIMENTS

Figure 3:
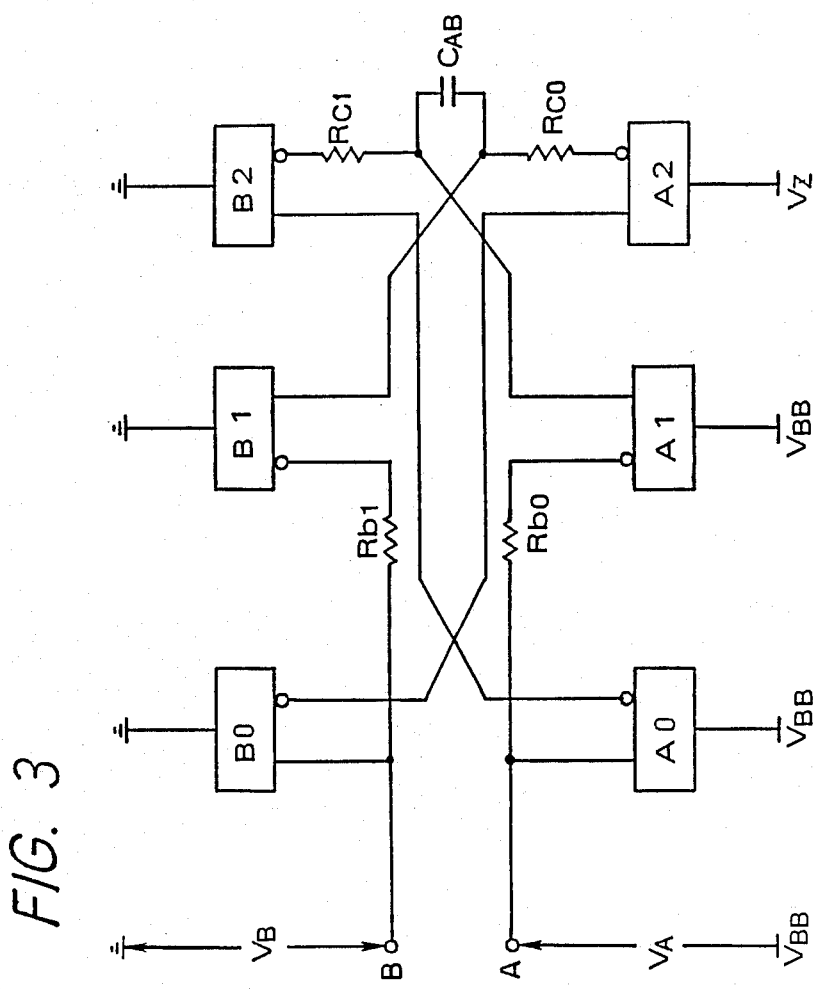
FIG. 3 is a block diagram illustrating an operation principle of a battery feed circuit according to the present invention.

A battery feed circuit according to the present invention will be described referring to a block diagram in FIG. 3. It utilizes three pairs of mirror circuits A0, B0, A1, B1, A2 and B2. They are arranged in cascade to the subscriber lines (lines A and B), and arranged symmetrically for both A and B lines. The output terminals of the current feed mirror circuit pair A0 and B0 are connected respectively to the subscriber lines A and B to feed their output currents to each of them as a DC supply source. The input terminals of the current feed mirror circuit pair A0, B0 (input terminals of the mirror circuits are represented by small circles) are respectively connected in series to the output terminals of the second mirror circuit pair B2 and A2. The input terminals of the first mirror circuit pair A1 and B1 are connected to the A and B lines via resistors Rb0 and Rb1, respectively, and the output terminals of the first mirror circuit pair are connected in series to the input terminals of the second mirror circuits B2 and A2 via resistors Rc1, and Rc0, respectively. Between the resistors Rc0 and Rc1 a capacitor $C_{AB}$ is connected.

When a voltage appears on the terminals A and B, currents flow in the input terminals of the first mirror circuits A1 and B1 corresponding to respective terminal voltages $V_A$ and $V_B$, and according to an original nature of the mirror circuit, the same amount of current having the same direction runs through the output terminals of the first mirror circuits A1, B1.

If voltages having equal phases are applied to the terminals A and B, the output currents of the first mirror circuits (A1, B1), are equal to each other. Therefore, both sides of the capacitor $C_{AB}$ are charged up to the same voltage, which is equivalent to having a circuit with no capacitors. Thus, the same currents run through the second mirror circuits (A2, B2), but the directions of the currents are reversed to those of the first mirror circuits (A1, B1), because their input terminals are connected in series to the first mirror circuits. Namely if the current flows into B1, the same current flows out from A2 and vice versa. These currents are fed to respective input terminals of the current feed mirror circuits A0 and B0. Since the input terminals of the current feed mirror circuits are connected in series to the second mirror circuits, the output currents of the current feed mirror circuits are the same but in an opposite direction to those of the second mirror circuits. Therefore, the output currents of the current feed mirror circuits have the same amplitude and the same direction as those of the input currents to the terminals A and B. This means the longitudinal input impedance of this circuit becomes low, and is a value which is equal to the feeding resistances. The feeding resistance is determined by the resistances of Rb0, Rb1 and a mirror ratio that is the ratio of input and output currents of the mirror circuit.

If there is a voltage difference between the terminals A and B, that is the input signal has a differential mode, the current difference appears between the output of the first mirror circuits A1 and B1. But such a differential component is bypassed by the capacitor $C_{AB}$, moreover, the capacitor $C_{AB}$ with the resistors Rc0 and Rc1 comprises a filter circuit for the differential mode signal. So, the differential component is not input to the second mirror circuits A2 and B2. Therefore, there appears no current corresponding to the differential mode input voltage. This means the circuit provides a very high impedance for the differential mode input signal. So, the input telephone signal that is a differential mode signal is fed to the 2- to 4-wire converter without loss. But for a noise having a longitudinal mode, the circuit has a low impedance, moreover the circuit is balanced for the lines A and B, so the output voltage of the noise on one line is canceled by noise on the other and no noise signal appears at the 2- to 4-wire converting hybrid circuit.

At a common terminal of the second mirror circuit A2 a constant voltage is supplied from a stabilized voltage source Vz. This protects the circuit from noise induced from battery source $V_{BB}$.

The battery feed circuit according to the present invention is further provided with a current limiting circuit or protecting the battery feed circuit from overcurrent caused by faults such as contact to ground or to $V_{BB}$ of the subscriber line, etc. Current limiting is accomplished as follows. If an overcurrent is detected, resistance of an input resistor to the current feed mirror circuit A0 or B0 is switched to a lower resistance. So, the mirror ratio of the mirror circuit is reduced and the current fed to the A or B lines by the current feed mirror circuit A0 of B0 is limited.

The principle of a 2- to 4-wire converting hybrid circuit will be explained with respect to a block diagram of FIG. 4. A 4-wire input signal received by an input terminal 4WR is converted to a current signal by a voltage to current converter (VI) 6, and fed to one input of a third mirror circuit pair A3 and B3. A first output of the mirror circuit A3 is fed to the current feed mirror circuit B0 that comprises the current feed circuit of FIG. 3, and the second output current is reversed in direction by the other circuit B3 in the third mirror circuit pair and fed to the other current feed mirror circuit A0. Therefore, from each circuit in the current feed mirror circuit pair A0 and B0 is output a two-wire signal having opposite phases from each other, and which are fed to the lines A and B, respectively.

The 2-wire signal received by the input terminals A and B is fed to an operational amplifier OP3, and the differential component is detected. In the output of the operational amplifier OP3 is included a component of a 4-wire input signal which is input to the terminal 4WR. This 4-wire input signal is output from the current feed mirror circuits A0 and B0 and turns around to OP3 together with the 2-wire signal which is input to the terminals A and B. Such a turn around signal has a reverse phase to that of the input signal at the terminal 4WR. So, the output of OP3 is mixed with a signal branched from the terminal 4WR in a proper network to erase the turn around 4-wire signal, and only a 2-wire signal is taken out from a 4-wire output terminal 4WS. This network is described in detail concerning FIG. 15.

Figure 1:
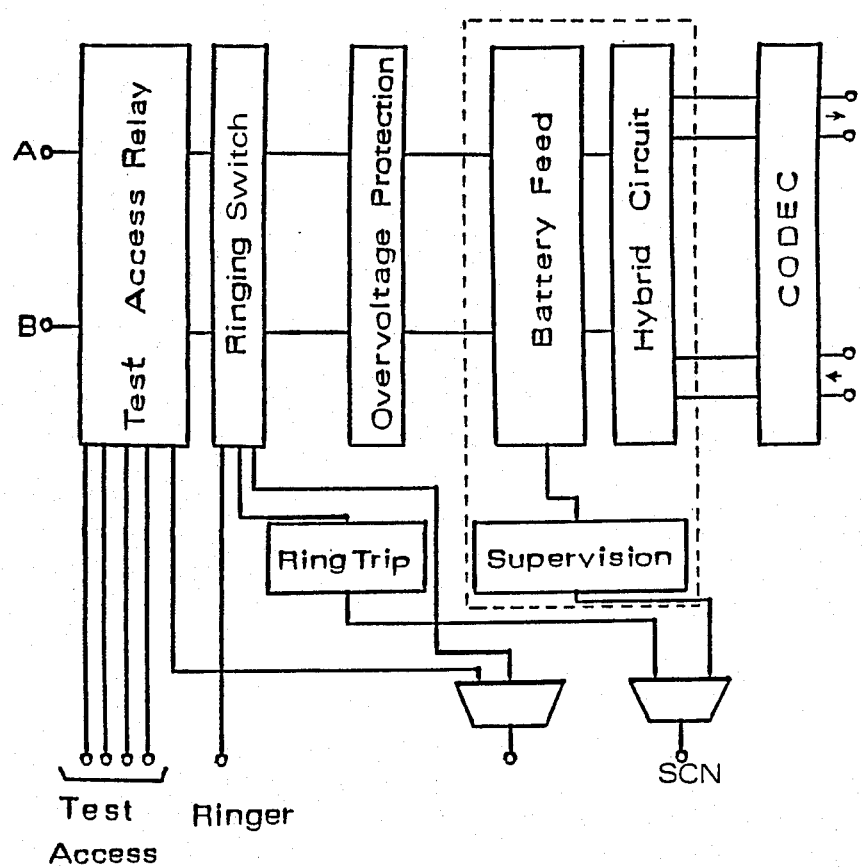
FIG. 1 is a block diagram of a subscriber line interface circuit (SLIC) illustrating its main functions.
Figure 5:
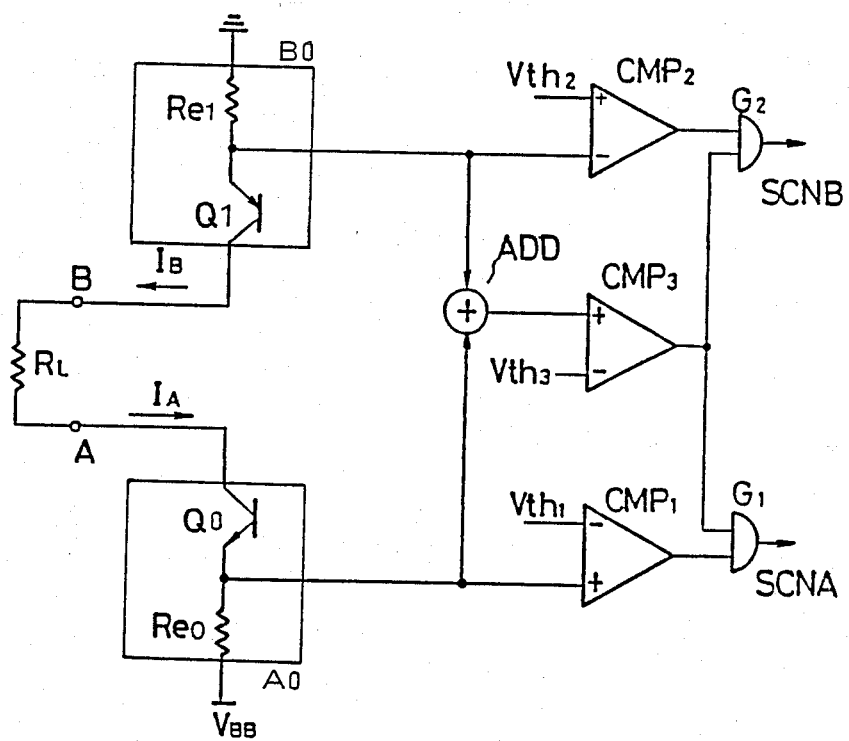
FIG. 5 is a block diagram for a supervision circuit of the present invention.

The supervision circuit identifying on-hook or off-hook states of the subscriber, and detecting the fault contact of the subscriber line to ground or voltage source will be explained with reference to the block diagram in FIG. 5. The current feed mirror circuits A0 and B0, comprising the current feed circuit shown in FIG. 1, includes power transistors Q0, Q1 and series resistors Re0 and Re1, respectively. The currents $I_A$ and $I_B$ running respectively in the lines A and B are detected as voltage drops across the resistors Re0 and Re1, respectively. These voltages are compared with threshold voltages Vth1 and Vth2 by first and second comparators CMP1 and CMP2, respectively. At the same time, the detected voltages are supplied to an adder circuit ADD, and this added voltage is also compared with a third threshold voltage Vth3 by a comparator CMP3. Outputs of these comparators are respectively fed to AND gates G1 and G2 as shown in FIG. 5.

In a normal off-hook state, the currents $I_A$ and $I_B$ are almost balanced, and their detected voltages are more than Vth1 and Vth2. The detected voltage sum is also more than Vth3. Therefore, both gate circuits G1 and G2 output supervising signals SCNA and SCNB, respectively. The variation of the currents $I_A$ and $I_B$ caused by noise is canceled by the adder circuit ADD, since the noise is induced in the lines A and B in a longitudinal mode. So, the output of the adder circuit is kept almost constant regardless of the noise. Therefore, the generated SCNA and SCNB signals are stable, so long as the noise current is not too high, which would decrease the currents $I_A$ or $I_B$ to less than the threshold value of Vth1 or Vth2.

If the lines A or B is grounded by fault, $I_A$ becomes large and $I_B$ becomes very small, but the output of the adder circuit is still over the threshold voltage Vth3. Therefore, the SCNB signal is not generated, but the SCNA signal is generated, so the status can be discriminated. On the contrary, if the line A or B contacts the voltage source $V_{BB}$, the SCNB signal is generated and the SCNA signal is not generated. In an on-hook state, the currents $I_A$ and $I_B$ are very small, so neither of the scan signals SCNA and SCNB is generated. Therefore, for all states, the status is discriminated.

Still another important feature of the present invention appears in a method of separating grounds in the system. Generally, the SLIC is operated with various kinds of voltage sources. For example, the battery supply circuit is operated by a voltage source between ground G and −48 volts, and logic circuits are operated with Vcc of +5 volt, $V_{EE}$ of −5 volt and ground E. So it is necessary to transmit signals between the systems having different grounds G and E for example. In other words, it is necessary to separate grounds G from E while the circuit is connected to each other. Usually a transformer is used for such ground separation, but use of a transformer should be avoided in IC circuits.

Figure 6:
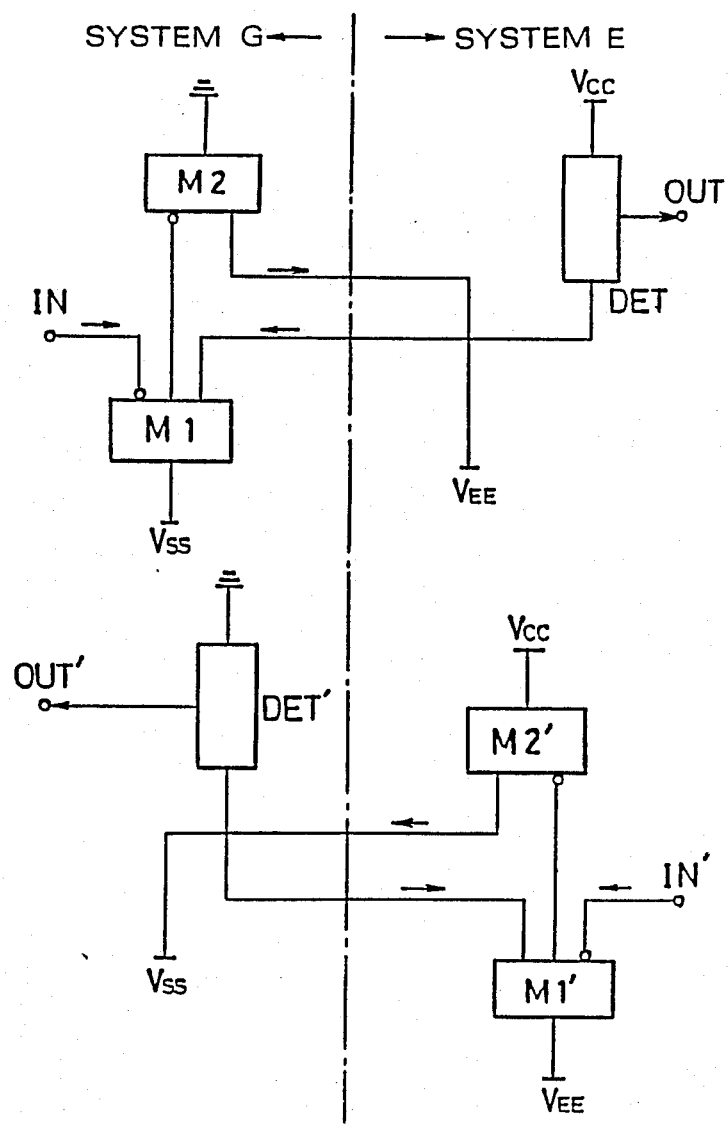
FIG. 6 is a block diagram illustrating a principle of a ground-separation method as applied in the present invention.

The present invention, as shown in FIG. 6, feeds a current from system E (that has a ground E) to system G (that has a ground G), for example, having an amplitude equal but opposite in direction to that of the signal current from system G to system E. By doing so, though the signal current flows between the systems G and E, it is always canceled by the current fed from the system E to G and vice versa, therefore the total current between the two systems is always zero. This is equivalent to the systems G and E being separated from each other. FIG. 6 shows a ground separation method according to this invention.

An input signal from the system G is applied to an input terminal IN, and it is fed to a mirror circuit M1. One output of M1 is fed to another mirror circuit M2. Another output of M1 is connected to Vcc via a detector DET, and an output of M2 is connected to the $V_{EE}$ voltage source of the system E. Since the current flowing from system E to G is equal but in opposite direction to that flowing from system G to E, the systems G and E are equivalent to being separate from each other, but a current, which is the same as that of the input signal at the input terminal IN of system G, flows through a detector DET of the system E. The signal from the input terminal IN of the system G is detected and taken out from an output terminal OUT of the system E. Similarly, a signal from the system E is input to an input terminal IN' of the system E, and taken out from an output terminal OUT' of the system G. This separating of system grounds is discussed in detail with reference to FIG. 19.

Figure 7:
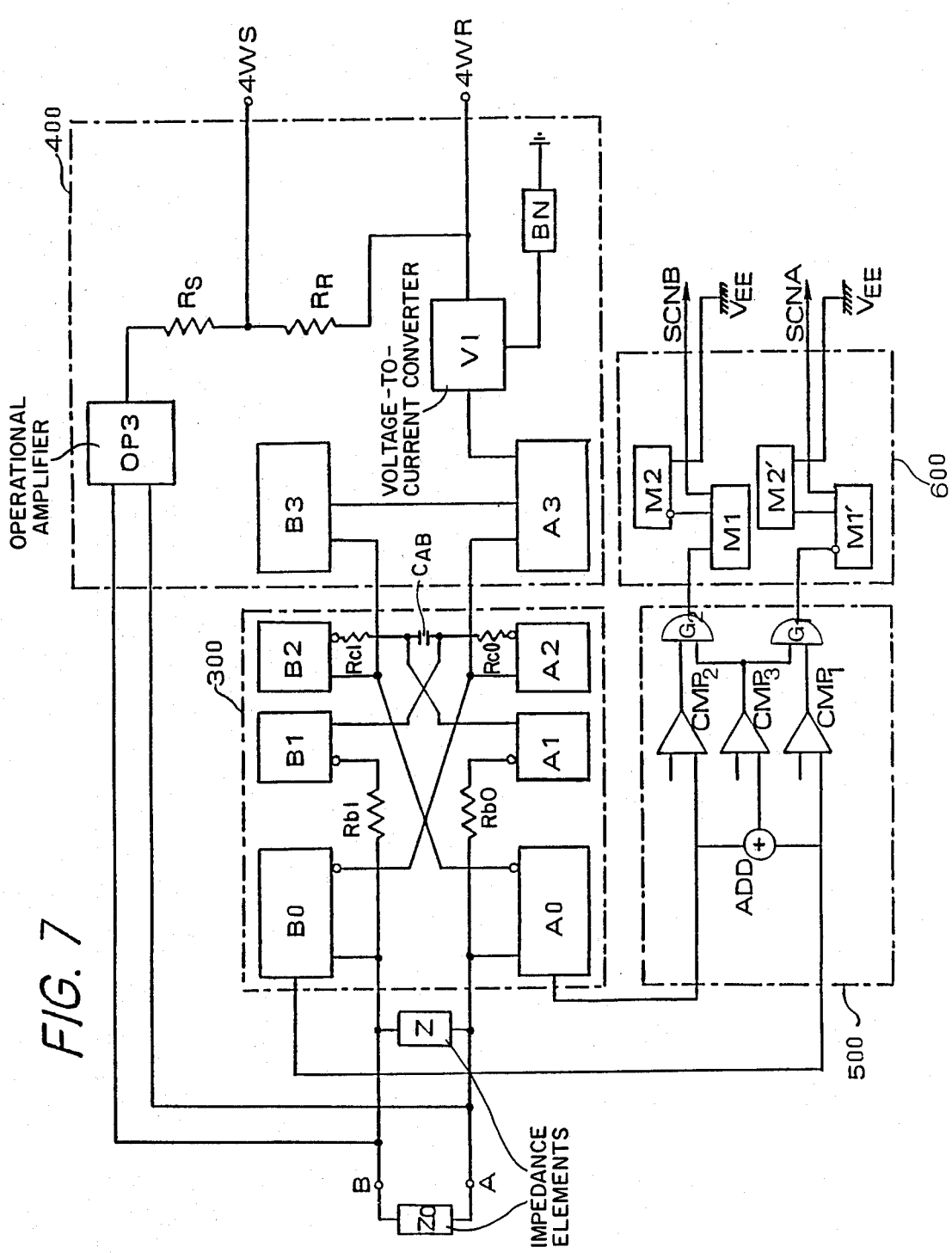
FIG. 7 is a block diagram illustrating a total figure of a SLIC comprising fundamental circuits according to the present invention.

Now a more detailed description of a subscriber line interface circuit (SLIC) according to the present invention will be given referring to the accompanying drawings. FIG. 7 is a block diagram illustrating a total configuration of an SLIC comprising fundamental circuits according to the present invention. The circuit corresponds to a portion encircled by a dotted line in a block diagram of FIG. 1. In FIG. 7, it will be clear that a portion encircled by a chained line 300 is a battery feed circuit corresponding to FIG. 3, a portion encircled by a chained line 400 is a 2- to 4-wire converting circuit corresponding to FIG. 4, a portion encircled by a chained line 500 is a supervision circuit corresponding to FIG. 5, and a portion encircled by a chained line 600 is a ground separation circuit corresponding to FIG. 6.

First, an embodiment of circuit parts performing the fundamental functions of the SLIC will be described, and then a total figure of the circuit will be given. Throughout the drawings, similar or like reference numerals or characters designate similar or corresponding parts in the figures.

Battery Feed Circuit

Figure 8:
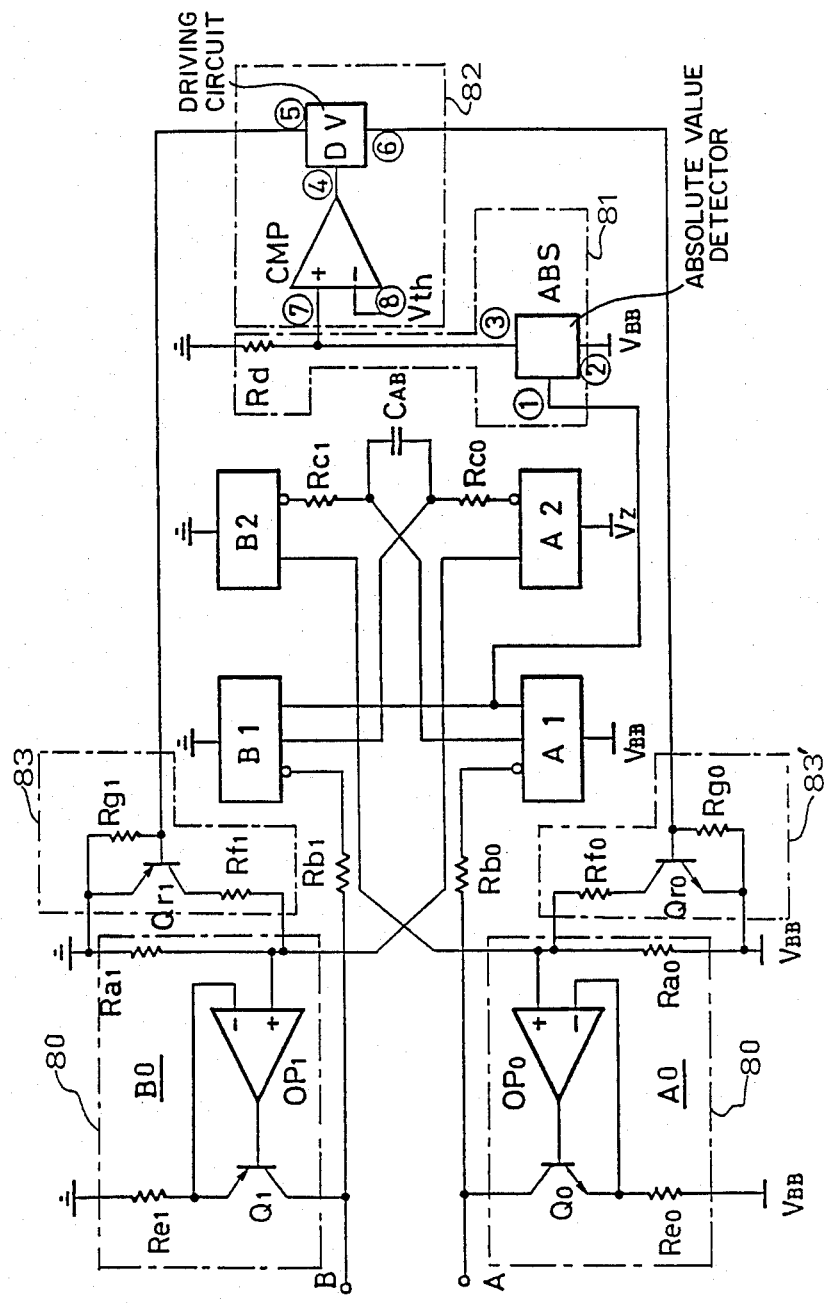
FIG. 8 is a block diagram of a battery feed circuit embodying the present invention.

FIG. 8 is a block diagram of a battery feed circuit embodying the present invention. The figure corresponds to FIG. 3 describing a principle of the battery feed circuit. The circuit comprises three pairs of mirror circuits, A0, B0, A1, B1, A2 and B2. Among them, the current feed mirror circuits A0 and B0, which are encircled by chained line 80, feed DC currents of approximately 20–100 mA to the subscriber lines A and B, respectively. The remaining mirror circuits are conventional small current devices which handle a current of less than 1 mA. It will be clear that the interconnection between these mirror circuits and resistors Rb0, Rb1, Rc0, Rc1 and the capacitor $C_{AB}$ is similar to that of FIG. 3, so further description of circuit connection is omitted for the sake of simplicity.

The circuit is constructed similarly for the lines A and B, so detailed description will be given mainly with respect to the line B. The current feed mirror circuit B0 is composed of an operational amplifier OP1, a transistor Q1 and resistors Ra1 and Re1. A non-inverting input terminal (designated by the symbol +) of the operational amplifier OP1 becomes the input terminal of the mirror circuit B0, and the collector of the transistor Q1 becomes the output terminal of the current feed mirror circuit B0. An inverting input terminal (designated by the symbol −) is connected to the emitter of Q1. A current ratio that is a ratio of the output current to the input current of a mirror circuit is determined by Ra1/Re1. Since the input current to B0 supplied by the mirror circuit A2 is small, the current ratio of B0 is chosen to be large. But the current ratios of the first and second mirror circuits A1, B1, A2 and B2 are usually set to one.

The value of resistors are also limited because of other conditions. The feeding resistances $Z_A$ and $Z_B$ of the battery feed circuit for the lines A and B are respectively given as $$Z_A Rb0 \cdot Re0/Ra0 \quad (1)$$

and $$Z_B Rb1 \cdot Re1/Ra1 \quad (2)$$

The lower these impedances, the better for noise reduction, but on the contrary, the higher the resistance of resistors Rb0 and Rb1, the better for transmission of the input 2-wire signal to the 2- to 4-wire converter without loss. So in one embodiment these resistors have been chosen such that, Re1 is 50 ohms, Ra1 is 6 kilohms, and Rb1 is 50 kilohms. Therefore, the current ratio is 120. Generally a higher value of resistance is difficult to fabricate in a monolithic IC, moreover, it is important to balance these resistors for the A and B lines; thus, the above values of resistance have been determined.

The power transistors Q0 and Q1 are Darlington transistors, and the capacitor $C_{AB}$ is 0.1–0.2 μF for example. It is necessary to chose the value of the capacitance and resistance to be $Rc1=Rc0>>1/j\omega C_{AB}$ where $\omega$ is the frequency of the input signal. The reason will become clear later. In this embodiment Rc0 and Rc1 were chosen to be a few tens of kilohms. These transistors Q0, Q1, together with resistors Re0, Re1 and capacitor $C_{AB}$, are connected to the circuit as external circuit elements, because their size and power consumption are large, and resistors Re0 and Re1 are used to trim the circuit balance. Other circuit elements of FIG. 8 are all fabricated in a monolithic IC chip.

Figure 9A:
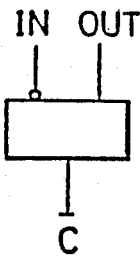
Figure 9B:
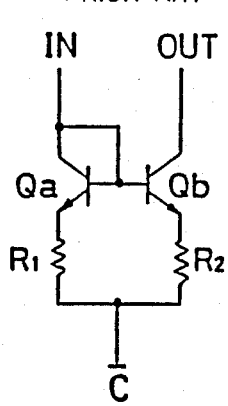
Figure 9C:
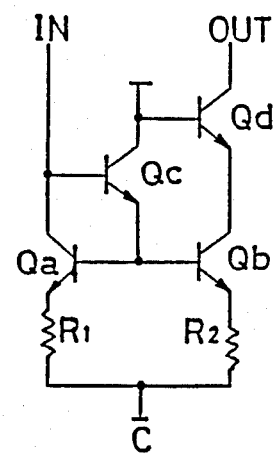
Figure 9D:
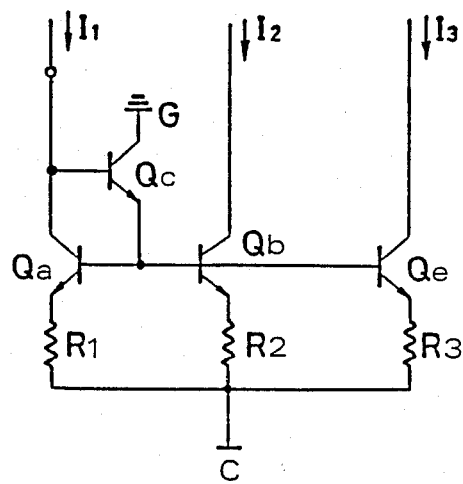

The remaining mirror circuits A1, B1, A2 and B2 may be conventional ones. Some examples are shown in FIGS. 9(a)–9(d). FIG. 9(a) is a circuit symbol of the mirror circuit, and its input terminal is identified by a small circle. C is a common terminal. If a current flows between IN (input terminal) and common terminal C, a current having a predetermined current ratio and the same direction to the input current flows between OUT (output terminal) and terminal C. In FIGS. 9(b)–9(d), Qa–Qe are transistors, and R1–R3 are resistors. The circuit of FIG. 9(b) is a basic configuration of a mirror circuit, and the circuit of FIG. 9(c) is further stabilized in its operation for a wider range of input current. The circuit of FIG. 9(d) has two outputs. The current ratio is determined by the ratio of R1/R2 and R1/R3 respectively. But, since the circuit configuration of the mirror circuit is not explicitly related to the invention, further description is omitted.

In FIG. 8, if a differential mode signal having a phase difference between the terminals A and B appears, currents corresponding to a respective voltage relative to ground will run through the input terminals of the first mirror circuit pair A1 and B2. These currents appear on both sides of the capacitor $C_{AB}$, and they are bypassed through $C_{AB}$, because as mentioned before, the resistances of Rc0 and Rc1 are large compared to the capacitive reactance of $C_{AB}$. Moreover, by a filter action of Rc0 and Rc1 combined with $C_{AB}$, these differential mode signal currents cannot flow into the second mirror circuit pair A12 and B2. Therefore, no differential mode signal is fed back to the current feed mirror circuits A0 and B0, and thus no current variation corresponding to the differential mode signal appears in the output terminals of A0 and B0. This is equivalent to the battery feed circuit having a high impedance against the differential mode signal, that is a telephone signal for example. So, the input signal is fed from the terminals A and B to the 2- to 4-wire converter circuit without loss.

On the contrary, if a longitudinal mode noise appears on the terminals A and B, the corresponding currents will appear on both sides of the capacitor $C_{AB}$. But since the phases of these currents are the same, the voltages of both sides of $C_{AB}$ are always equal. This is equivalent to having no capacitor for the longitudinal signal. So, these currents run in the mirror circuits A2 and B2, and feed back to A0 and B0. Since the current ratio of A0 and B0 are large, a large current having the same phase as the input longitudinal signal appears in the circuit. This means the effective longitudinal input impedance of the battery feed circuit becomes a low value, which is equal to the battery feed resistance. In fact, the input impedance for the longitudinal mode is as shown by the equations (1) and (2) respectively for the lines A and B.

As has been described above, the circuit of FIG. 8 satisfies the fundamental requirements of a battery feed circuit. And as mentioned before, the circuit is similar for the lines A and B, and the balance of impedance for A and B lines is very good. So, the circuit of FIG. 8 is a balanced type battery feed circuit. Moreover, the balance can be precisely adjusted by adjusting the external resistors Re1 and Re0. So, the longitudinal noise can be reduced very much. In the above embodiment a longitudinal balance of 55 dB has been achieved.

In FIG. 8, the voltage Vz supplied to the common terminal of the second mirror circuit A2 is equivalent to that of the source voltage $V_{BB}$ applied to other mirror circuits, but its voltage is especially stabilized in order to reduce noise induced from the voltage source $V_{BB}$. Noise suppression is accomplished by this stabilized voltage source Vz as follows. Firstly, as a general characteristic of a mirror circuit, its impedance seen from its output terminal is very high. So in FIG. 8, if $V_{BB}$ is varied by noise, the voltage variation does not appear in the output terminal of the current feed mirror circuit A0. Therefore, the noise from voltage source of A0 is negligible. Secondly, with regard to the second mirror circuit A2, the noise can be neglected, because its voltage source is stabilized. Thirdly, the voltage variation of $V_{BB}$ causes a noise in the first mirror circuit A1, therefore, it must be canceled.

If $V_{BB}$ varies, there are two current paths that generate a noise. The first noise current path is composed of $V_{BB}$, A1, Rb0, terminal A, subscriber equipment, terminal B, Rb1, and B1 and ground. But as mentioned before, Rb1 and Rb0 are chosen to be very high compared to the impedance between terminals A and B. So, the noise voltage induced in such first path becomes very low between the terminals A and B. Therefore, such noise is substantially negligible.

The remaining noise path is composed of $V_{BB}$, A1, Rc1, B2 and ground. However, the current that runs through the output terminal of A1 runs not only through Rc1, but also runs through Rc0, because Rc1 and Rc0 are alternatively connected to each other by the capacitor $C_{AB}$. Accordingly, the noise current is divided into half and both half currents respectively run through the second mirror circuit pair B2 and A2. The current direction is the same for B2 and A2. For example, if the current runs into B2, the same current runs into A2 and vice versa. So, the output currents of B2 and A2 have the same phase. Such currents are fed to the input terminals of A0 and B0 respectively; therefore, the outputs of A0 and B0 always have the same phase for the noise induced from $V_{BB}$. So, the noise voltage at the terminals A and B becomes equal, and it cannot be picked up by the 2- to 4-wire converter.

The above description has been given with respect to A1. But the noise current running through B1 is reduced in a similar manner. Therefore, by only one stabilized voltage source Vz, the noise induced from the voltage source $V_{BB}$ can be eliminated.

Figure 10:
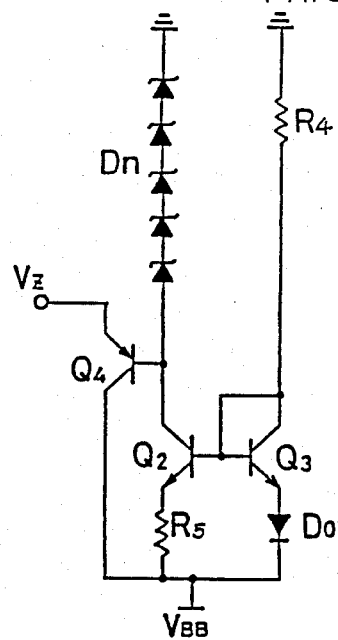
FIG. 10 is an example of a voltage stabilizing circuit block diagram illustrating a principle of a ground separation method as applied in the present invention.

In the above embodiment, $V_{BB}$ is −48 volts, and Vz is −35 volts, for example. The stabilized voltage source may be of any kind, for example, series connected zener diodes and resistors(s) may be applicable. But the power consumption should be small, and it is desirable that the internal resistance between the terminal Vz and ground is low, but the impedance between Vz and $B_{BB}$ is high in order to reduce the noise induction from $V_{BB}$. An example of such voltage stabilizing circuit is shown in FIG. 10. In FIG. 10, Q2–Q4 are transistors D0 is a diode, R4, R5 are resistors of 100 kilohms and 3 kilohms, respectively, and Dn are zener diodes connected in series. It will be understood that the circuit of FIG. 10 comprises a modified mirror circuit. A current flows from a ground to a negative voltage source $V_{BB}$ via R4, Q3 and D0, so the same current flows through Dn, Q2 and R5. A constant voltage Vz determined by the zener diodes Dn is supplied by an emitter follower transistor Q4 to a common terminal of the second mirror circuit A2 shown in FIG. 8. Since the configuration of the stabilized voltage source is not explicitly related to the invention, further description is omitted.

Figure 11:
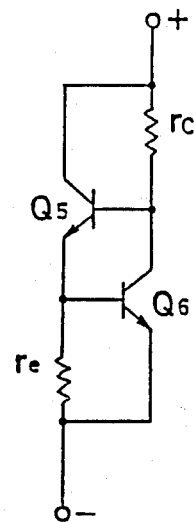
FIG. 11 is an example of a current limiting circuit applicable to the battery feed circuit of the present invention.
Figure 12:
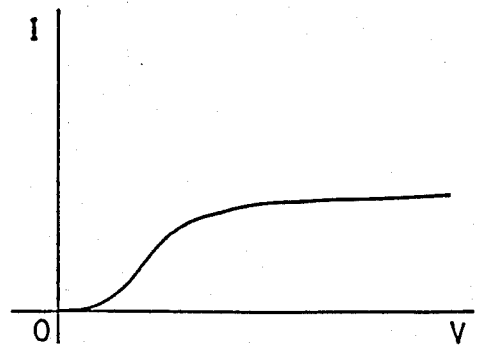
FIG. 12 is a graph of voltage-current characteristics of the current limiting circuit in FIG. 11.

Sometimes, it occurs that the supply current of the battery feed circuit increases very high, for example, when the subscriber uses a very low impedance device, the subscriber lines are very short, or accidentally shortcircuited. In such cases it is desirable to limit the supply current to less than a predetermined value. For such purpose the resistors Rb0 and Rb1 are replaced by a current limiting circuit. An example of a current limiting circuit applicable for such purpose is shown in FIG. 11. The symbols of + and − indicate respectively a positive and negative side of the suppy voltage. This circuit is composed of transistors Q5, Q6 and resistors $r_e$, and is conventional in the art, so further description is omitted. An example of voltage to current characteristics is given in FIG. 12. The curve can be varied by selecting the resistance of $r_c$ and $r_e$. Normally, the circuit is adjusted to operate at a high inclination portion of the curve. But if the supply current increases abnormally, the input currents to B1 and A1 are limited, so the output of the current feed mirror circuits B0 and A0 cannot exceed a value corresponding to the maximum value of FIG. 12.

Overcurrent Protection Circuit

A battery feed circuit of FIG. 8 is provided with a function to protect the circuit from an overcurrent caused by a fault contact of the subscriber lines to ground or $V_{BB}$. The overcurrent protection circuit according to the present invention is composed of resistance switching means which is encircled by chained line 83 and 83' in FIG. 8 for switching an input resistor of the current feed mirror circuits A0 and B0; detecting means encircled by chained line 81 for detecting a difference between the current flows of the first mirror circuits A1 and B1; and control means encircled by chained line 82 for comparing the detected current with a threshold value and controlling the switching of the resistance switching means.

While the subscriber lines are operated normally, the currents running through the lines A and B are almost balanced, so the currents running through the first mirror circuits A1 and B1 are almost equal. But if one of the lines is short-circuited to ground or to the voltage source, the current becomes imbalanced. Such imbalance is detected by the detecting means B1, and it is compared with a threshold value $V_{th}$. When the imbalance exceeds the predetermined threshold value $V_{th}$, the control means controls the resistance switching means to shunt the input resistor Ra0 or Ra1 with another resistor. This reduces the current ratio of the current feed mirror circuit A0 or B0, so the output current of A0 or B0 is reduced.

As shown in FIG. 8, the first mirror circuits A1 and B1 are provided with two output terminals (an example of such circuits is shown in FIG. 9(d)). The second outputs of A1 and B1 are connected to each other and connected to the detecting means 81. By doing so, the detecting means 81 receives a difference current between the output currents of A1 and B1. In a normal state, the currents of the lines A and B are equal but in opposite direction to each other, since the battery current flows along a circuit composed of ground, B0, terminal B, subscriber's equipment, terminal A, A0 and $V_{BB}$. The input currents of B1 and A1 are proportional to the output currents of B0 and A0 respectively, so the output currents of B1 and A1 are equal to each other but their direction is opposite to each other.

Figure 13:
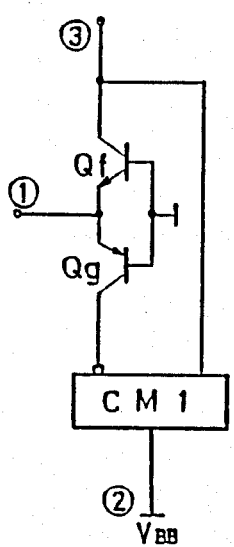
FIG. 13 is a circuit diagram of an absolute value detector applied to the battery feed circuit of the present invention.

The detecting means 81 is composed of a resistor Rd and an absolute value detector ABS which receives the difference current and detects its absolute value. The output current of ABS is converted to a voltage by the resistor Rd whose resistance is a few kilohms. An example of an absolute value detector is shown in FIG. 13. It is composed of two transistors Qf (npn), Qg (pnp) and a mirror circuit CM1 having a mirror ratio of 1. The circled terminals 1-3, correspond respectively to an input terminal, a voltage source terminal, and an output terminal, and they correspond respectively to the circled terminals 1-3 in FIG. 8. In such a circuit, if, for example, a current runs into the terminal 1, it runs into an input terminal of the mirror circuit CM1 via the transistor Qg, so the same current runs into CM1 from the terminal 3. On the contrary, if a current runs out from the terminal 1, it runs in from the terminal 3 and through the transistor Qf. So, the same amount of current runs into the output terminal 3 regardless of the direction of current running through the input terminal 1. This is equivalent to the current running into the output terminal 3 being the absolute value of the input terminal 1. The absolute value detector may be of any kind, but since it is not related explicitly to the invention, further description is omitted.

Figure 14:
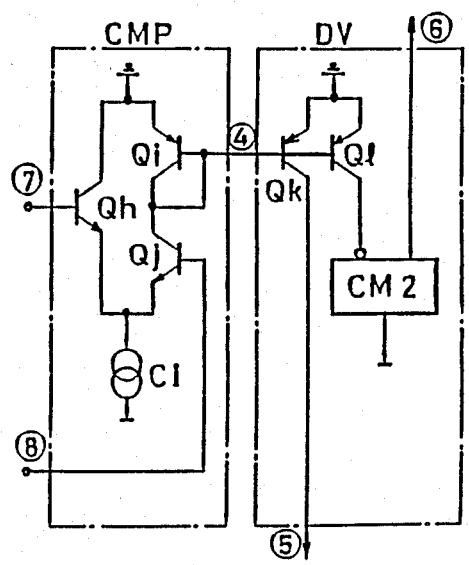
FIG. 14 is a circuit diagram of a comparator and driving circuit for an overcurrent protection circuit of the present invention.

A circuit diagram of the control means is shown in FIG. 14. It comprises a comparator CMP and a driving circuit DV. The encircled terminals 4-8 correspond respectively to the encircled terminals 4-8 in FIG. 8. The comparator CMP comprises three transistors Qh (npn), Qi (pnp), Qj (npn) and a constant current source CI. These circuits are conventional ones in the art. The voltage across the resistor Rd (FIG. 8) is fed to the terminal 7 and it is compared with a predetermined threshold voltage Vth ($-2$ volts for example) supplied to the terminal 8 of the comparator CMP.

The driving circuit DV comprises two transistors Qk, Ql (both pnp) and another mirror circuit CM2 having a mirror ratio 1. The terminals 5 and 6 are connected respectively to the resistance switching means 83' and 83 in FIG. 8.

When the output current of the absolute value detector ABS is small, that is the subscriber line is in its normal state, the transistor Qh is ON, and transistors Qi and Qj are OFF. So, the transistors Qk and Ql are OFF and the resistance switching means 83 and 83' do not operate. So the input resistor for the current feed mirror circuits A0 and B0 are respectively Ra0 and Ra1, and circuits A0 and B0 feed predetermined currents to the subscriber lines A and B, respectively.

If the output current of ABS becomes large, that is the subscriber line is in an unusual state, and the input voltage of the terminal 7 increases over the predetermined threshold voltage Vth, the transistor Qh turns OFF. So, the transistors Qi, Qj, Qk and Ql turn ON, and driving currents appear in the terminals 5 and 6. These currents run through the resistors Rg1 and Rg0 in FIG. 8 respectively, and make the transistors Qr0 and Qr1 of the resistance switching means 83 and 83' conductive. This implies that the input resistors Ra0 and Ra1 are shunted by Rf0 and Rf1 respectively. So the effective resistance drops to a lower value. Since the current ratio of A0 and B0 are determined by Ra0/Re0 and Ra1/Re1 respectively, the mirror ratio becomes small and the output currents of A0 and B0 are suppressed to a low value. This value can be adjusted by selecting the resistance values of Rf0 and Rf1. In the above embodiment, the mirror ratio was reduced from 120 to 20, and the current was suppressed to one sixth of the normal current when the subscriber line was short-circuited.

2- to 4-wire converter

Figure 15:
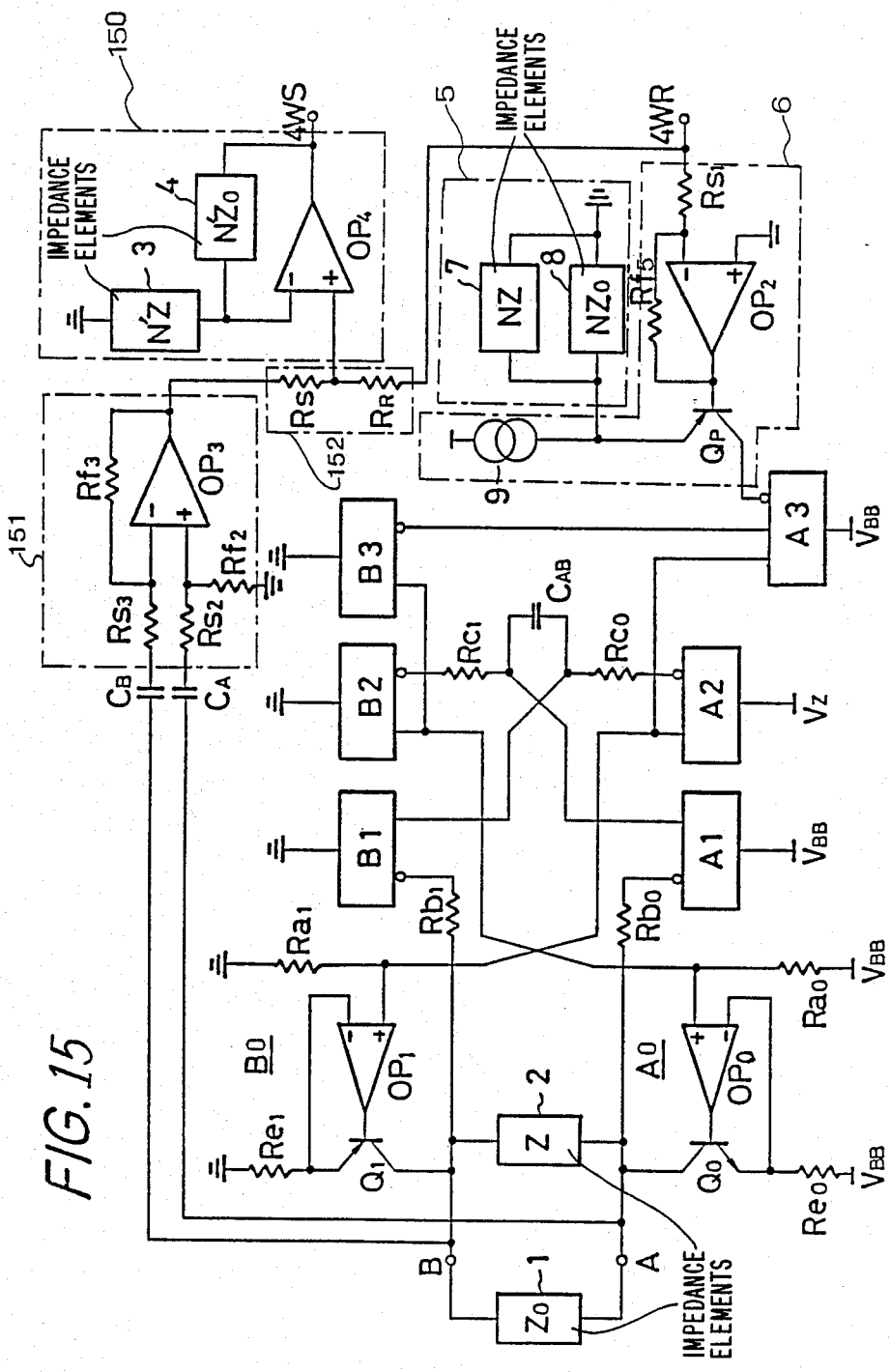
FIG. 15 is a block diagram showing a relationship between a 2- to 4-wire converter and the battery feed circuit of the present invention.

FIG. 15 shows a block diagram of a 2- to 4-wire converter according to the present invention. Comparing it with the block diagram of FIG. 4 which explains the operation principle of the 2- to 4-wire converter, the relationship of the converter circuit to the battery feed circuit will become more apparent. A fundamental requirement of the 2- to 4-wire converter is to transmit the 4-wire signal received at a terminal 4WR to subscriber equipment Zo connected to the terminals A and B, and to transmit a signal sent from the subscriber equipment to an output terminal 4WS of the 4-wire line, and it should not turn around the input signal of 4WR to the output terminal 4WS.

There is still another requirement for the 2- to 4-wire converter, that the above requirement should be satisfied over an operational frequency band of the equipment. Generally, at the input side of the battery feed circuit, the terminals A and B are terminated by a termination impedance Z (denoted by 2 in the figure), but the load impedance Zo that includes the impedances of the subscriber equipment and the subscriber line varies by the variation of equipment and the length of the subscriber line, so it is difficult to perfectly terminate the subscriber line with the battery feed cicuit. Moreover, the termination impedance Z has some frequency characteristics, so the above requirement becomes more difficult.

Figure 4:
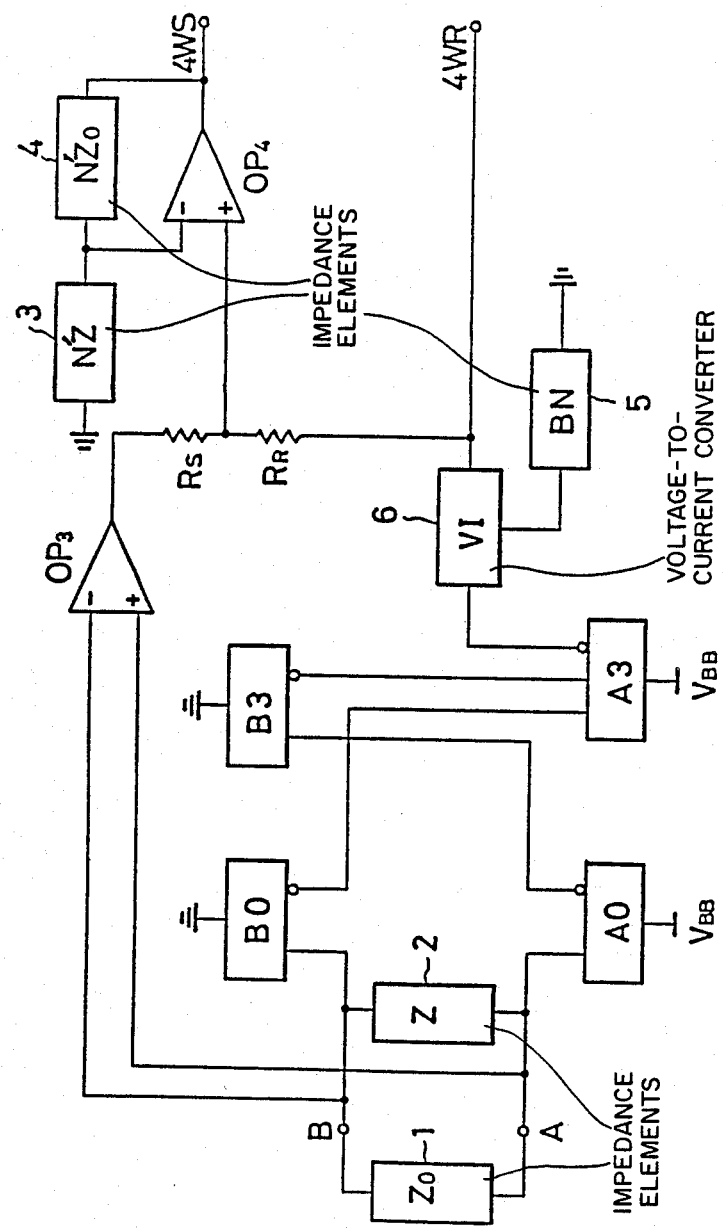
FIG. 4 is a block diagram illustrating an operation principle of a hybrid circuit for converting a 2-wire signal to a 4-wire signal or vice versa according to the present invention.

In FIG. 15, portions encircled by chained lines 5 and 6 correspond respectively to the compensation network 5 and the voltage to current converter 6 in FIG. 4. The 4-wire signal received at terminal 4WR is input to an inverting input terminal (−) of an operational amplifier OP2 via a resistor Rs1. The non-inverting input terminal (+) is grounded. The output of OP2 is fed back to the input by a resistor Rf5. A pnp transistor Qp is supplied its current from a constant current source 9. Between the output terminal of the constant current source 9 and ground are loaded the compensation network 5 composed of parallel impedance elements 7 and 8. the impedances of these impedance elements are respectively NZ and NZo which are respectively N times as high as those of the termination impedance Z and the load impedance Zo, that is, the impedance of the subscriber equipment including the subscriber line. Therefore, the total impedance of the network is N times as high as the total impedance at the input side of the current feed circuit composed by Z and Zo. If the parallel impedance of Z and Zo is B, the total impedance of the compensation network 5 becomes B·N.

The input signal voltage $V_{4R}$ at the terminal 4WR is multiplied by Rf5/Rs1 by the operational amplifier OP2, and fed to the base of a pnp transistor Qp. If a base emitter voltage $V_{BE}$ of the transistor Qp is neglected, a current corresponding to the output voltage of OP2 runs through the compensation network 5. So, $i_p$, the current running through the transistor Qp, becomes $$i_p = \left(\frac{Rf5}{Rs1}\right)V_{4R} \Big/ \frac{NZ \times NZo}{NZ + NZo} = \left(\frac{Rf5}{Rs1}\right)V_{4R}/B \cdot N$$

where $$B = \left(\frac{Zo \times Z}{Zo + Z}\right)$$

is a total impedance when Zo and Z are connected in parallel.

Since the internal impedance of the constant current source 9 is infinity, this current runs through one input of the third current mirror circuit pair A3. A3 has two output terminals, one output is fed to the current feed mirror circuit B0 and the other output is inverted in direction by another mirror circuit B3 and fed to A0. Therefore, from these current feed mirror circuits A0 and B0 are sent out currents having an amplitude corresponding to the input voltage, but with phases opposite to each other. So $_{AB}$, the voltage across the 2-wire line terminals A and B, becomes $$V_{AB} = i_p \times M \times B$$

where M is the current ratio of A0 and B0, so $$V_{AB} = (Rf5/Rs1)(V_{4R}/BN) \times M \times B \quad (3)$$
$$= (Rf5/Rs1) \times (M/N) \times V_{4R}$$

Therefore, $V_{AB}$, the output voltage of the 2-wire signal, becomes proportional to the input voltage $V_{4R}$ of the 4-wire signal. It is important in the above equation (3), that $V_{AB}$ is related neither to the load impedance Zo nor the termination impedance Z. This means the output voltage is neither related to Zo nor Z; therefore, the above mentioned frequency characteristics of Z and Zo are all eliminated.

By choosing the value of M/N, Rf5 and Rs1, it is possible to adjust the gain of the circuit. In an embodiment the values of M and N have been chosen to be respectively 120 and 100, and Rf5 and 5 kilohms and Rs1 waws 10 kilohms. The value of N has another significance, as has been mentioned above, the impedances of NZ and NZo are N times as high as those of Z and Zo respectively. So, the resistances are N times higher, and capacitances are 1/N times smaller than those of Z and Zo. This means their size and the currents they carry become smaller. This is preferable to miniaturize their size or fabricate them in a monolithic IC.

The 2-wire signal applied to the terminals A and B from the load impedance Zo is fed to a third operational amplifier OP3 via capacitors $C_A$, $C_B$ and resistors Rs2, Rs3. The inverting and non-inverting input voltages of OP3 are respectively fed back by a resistor Rf3 or divided by a resistor Rf2. Neglecting the reactive impedances of $C_A$ and $C_B$, and choosing the resistances as Rs2=Rs3, Rf2=Rf3, gain k of OP3 becomes $$k = Rf3/Rs3.$$

Let the input voltage of the 2-wire signal from the load Zo be $V_2$, its voltage between the terminals A and B is given as $$V_{AB} = \left(\frac{Z}{Z + Zo}\right)V_2.$$

This voltage is fed to the third operational amplifier OP3 having a gain of k, and led to a fourth operational amplifier OP4. The output of OP4 is fed back through the impedance networks 3 and 4 each having an impedance of N'Z and N'Zo respectively, namely, N' times as high as those of the termination impedance Z and the load impedance Zo of the 2-wire lines A and B. Therefore, $V_{4S}$, the output voltage of the operational amplifier OP4, becomes $$V_{4S} = V_{AB} \cdot k \cdot \left(\frac{R_R}{R_R + R_S}\right) \cdot \left(1 + \frac{N'Zo}{N'Z}\right) \quad (4)$$
$$= \left(\frac{Zo \times Z}{Zo + Z}\right) \cdot k \cdot \left(1 + \frac{N'Zo}{N'Z}\right)\left(\frac{R_R}{R_R + R_S}\right) \cdot V_2$$
$$= k \cdot \left(\frac{R_R}{R_R + R_S}\right) \cdot V_2$$

As can be seen in the equation (4), the 4-wire output voltage $V_{4S}$ is proportional to the 2-wire input voltage $V_2$. And since the equation (4) is related to neither Z nor Zo, the problem with frequency characteristics has been also avoided.

The 4-wire signal appearing at the terminals A and B is also fed to the operational amplifier OP3 and becomes a turn around signal. But as can be seen in the circuit of FIG. 15, the 4-wire input signal is also fed to the operational amplifier OP4 via a resistor $R_R$, and its phase is reversed to that of the turn around signal. Therefore, by adjusting the resistance of $R_S$ and $R_R$ so as to be $$|V_{p3}|/R_S = |V_{4R}|/R_R$$

it is possible to cancel both signals. In such a manner, the turn around of the signals from 4-wire input to the 4-wire output has been avoided. Thus, all important features required by a 2- to 4-wire converter have been satisfied.

In the above embodiment the resistance of Rs1 and 10 kilohms and Rf5 was 5 kilohms, Rs2 and Rs3 were 200 kilohms, Rf2 and Rf3 were 32 kilohms, $R_S$ was 10 kilohms, $R_R$ was 100 kilohms, and capacitances of $C_A$ and $C_B$ were 0.1 μF.

Figure 16:
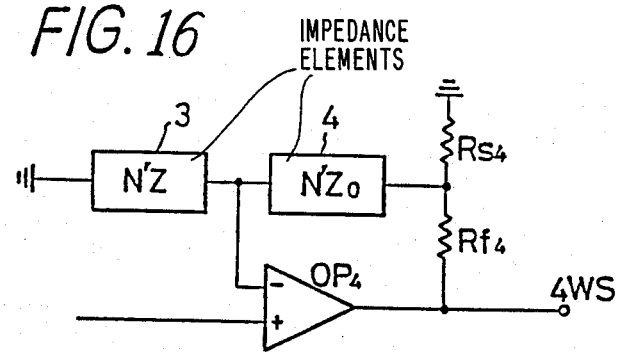
FIG. 16 is a circuit diagram of another embodiment of a circuit applicable to the 2- to 4-wire converter of FIG. 15 for correcting its frequency characteristics.

Some modification of the 2- to 4-wire converter of FIG. 15 is possible. FIG. 16 shows another embodiment of the circuit applicable for correcting the frequency characteristics of the 2- to 4-wire converter of FIG. 15. The circuit is applicable to replace a portion encircled by a chained line 150 in FIG. 15. Compared to that of FIG. 15, the circuit of FIG. 16 is provided with additional resistors Rf4 and Rs4 connected in series between the output terminal of the fourth operational amplifier OP4 and ground. And the impedance element 4 (N'Zo) is connected to the junction point of Rf4 and Rs4. The gain G is gen as $$G = \left( \frac{Rf4}{N'Zo} + \frac{Rf4}{Rs4} + 1 \right)\left( 1 + \frac{N'Zo}{N'Z} \right) - \frac{Rf4}{N'Zo}$$

Since N'Zo and N'Z are very large compared to Rs4 and Rf4, the gain can be written as $$G = \left( \frac{Rf4}{Rs4} + 1 \right)\left( 1 + \frac{N'Zo}{N'Z} \right)$$

Therefore, it is possible to vary the gain G by varying the resistance of Rs4 and Rf4 without disturbing the frequency characteristics of the circuit. In an embodiment Rs4 and Rf4 were both chosen to be less than 1 kilohm.

Figure 17:
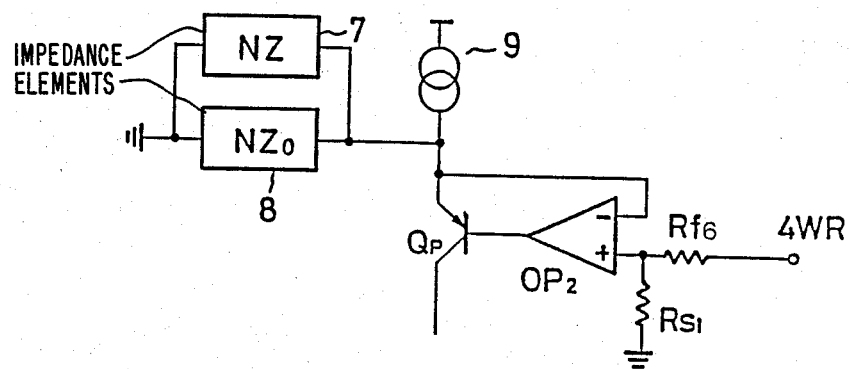
FIG. 17 is a circuit diagram for another embodiment of a voltage to current converter applicable to the 2- to 4-wire converter of FIG. 15.

FIG. 17 shows a circuit diagram of another embodiment of the voltage to current converter which can take the place of the portion encircled by chained lines 5 and 6 in the circuit of FIG. 15. In the circuit of FIG. 17, the emitter voltage of the transistor Qp is fed back to the inverting input terminal (−) of the operational amplifier OP2. And the input signal 4WR is fed to the non-inverting input terminal (+) via a resistor Rf6, and the non-inverting terminal is grounded through a resistor Rs1.

Such a circuit can suppress the variation of the frequency characteristics due to variation of gain of the transistor Qp. So, more stable operation can be expected. It should be pointed out that the phase of the output of this circuit is reversed to that of FIG. 15. Thus, to cancel the turn around voltage of 4-wire signal, it is necessary to reverse the input connection of OP3 in FIG. 15.

The converted current from the input voltage $V_{4R}$ by the circuit of FIGS. 17 becomes $$i_p = V_{4R} \left( \frac{Rs1}{Rs1 + Rf6} \right) / \left( \frac{NZo \times NZ}{NZo + NZ} \right)$$

So, as has been described with respect to FIG. 15, the output voltage of the 2-wire signal becomes $$V_{AB} = \left( \frac{Rs1}{Rs1 + Rf6} \right)\left( \frac{M}{N} \right)V_{4R} \tag{5}$$

This equation corresponds to equation (3). So the problem of frequency characteristics has been avoided.

As can be seen the circuit may be modified in various ways, but the spirit of the invention is to compensate the frequency characteristics by a parallel impedance provided in the 4-wire signal side having N times higher impedance than that of parallel impedance composed of the load and the terminal impedances at the 2-wire side.

Supervision Circuit

Figure 18:
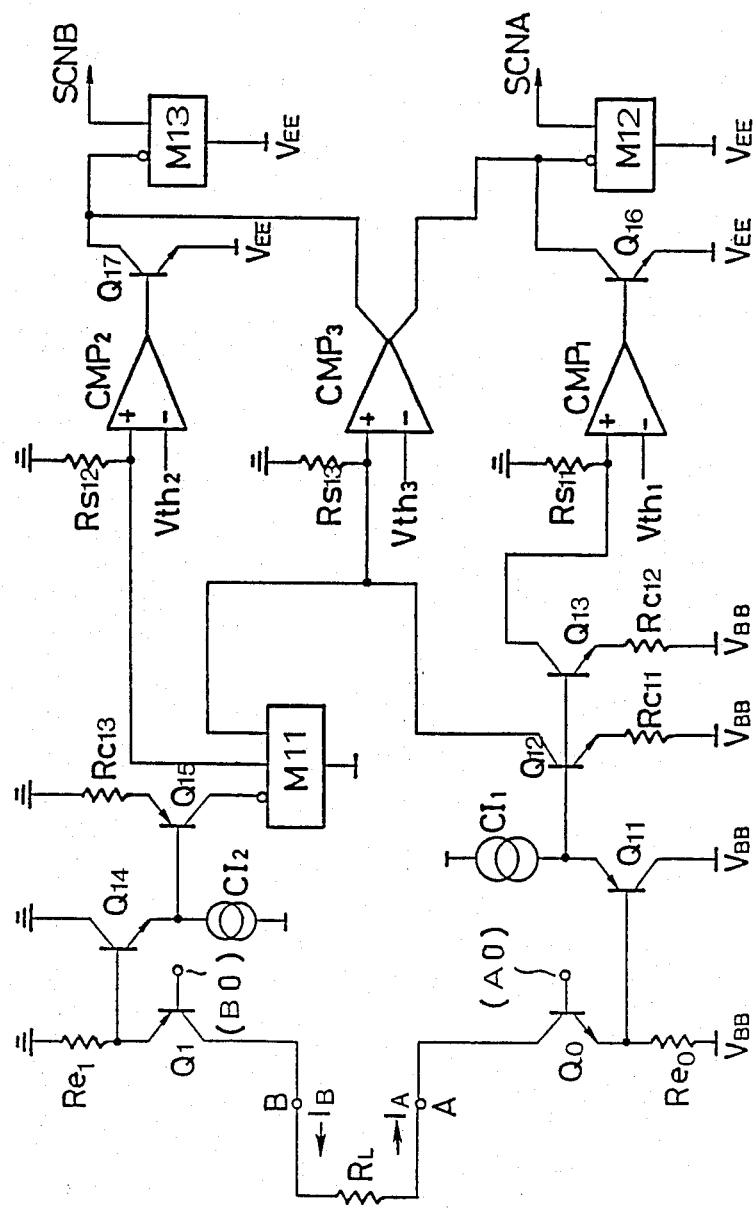
FIG. 18 is circuit diagram of a supervision circuit shown in FIG. 5.

The supervision circuit to detect the condition of the subscriber line and send a signal corresponding to a state of the subscriber line such as on-hook, off-hook, grounded or contacted to a voltage source is shown in FIG. 18. This circuit corresponds to a portion encircled with a chained line 500 in FIG. 7, which shows the entire circuit configuration of the SLIC.

In FIG. 18, the transistors Q0, Q1 and the resistors Re0, Re1 belong respectively to the current feed mirror circuits A0 and B0 as shown in FIG. 5 or 8. They supply currents $I_A$ and $I_B$ to the subscriber lines A and B, respectively. These currents are detected as a voltage across Re0 or Re1 by transistors Q11 or Q14, respectively. Since the emitters of these transistors are respectively connected to constant current sources CI1 and CI2, their input impedances become very high. Therefore, the currents $I_A$ and $I_B$ are detected without disturbance of the detectors. Since the bases of transistors Q12 and Q13 are connected to the emitter of Q11, their voltages become equal to that of the resistor Re0 which has a relatively low resistance (50 ohms for example). This voltage results in current flow in resistors Rc11 and Rc12. Similarly, the emitter voltage of a transistor Q15, the base of which is connected to the emitter of Q14, becomes equal to that of the resistor Re1, and results in current flow in a resistor Rc13.

The current running through the resistor Rc13 runs into a mirror circuit M11 and its one output current is converted to a voltage by a resistor Rs12 and fed to a + side input terminal of a comparator CMP2. Another output current of the mirror circuit M11 runs through a resistor Rs13. Through this resistor R13 also runs the current that runs through the resistor Rc11, therefore, the voltage at the + input terminal of the comparator CMP3 corresponds to a sum of $I_A$ and $I_B$. Such a circuit configuration, therefore, corresponds to the adder circuit ADD in FIG. 7. Namely, the input circuit of the comparator CMP3 is a wired OR connected adder circuit.

The current running through a resistor Rs11 is converted to a voltage, then fed to a first comparator CMP1 to be compared with a first threshold voltage Vth1. The one output current of the mirror circuit M11 is converted to a voltage by the resistor R12, and fed to the second comparator CMP2 to be compared with a second threshold voltage Vth2. And the voltage across the resistor Rs13 is compared with a third threshold voltage Vth3 by a third comparator CMP3.

A circuit comprising a mirror circuit M12 and a transistor Q16 corresponds to the gate G1 in FIG. 7, and a circuit comprising a mirror circuit M13 and a transistor Q17 corresponds to the gate G2 of FIG. 7. The threshold voltages Vth1 and Vth2 are relatively low voltage −1 volt for example. So, when the subscriber line is an off-hook state the currents $I_A$ and $I_B$ flow, and even if the load resistance $R_L$ of the subscriber equipment is relatively high and the currents $I_A$ and $I_B$ are relatively small, the input voltage to CMP1 and CMP2 become larger than Vth1 and Vth2 respectively, then transistors Q16 and Q17 turn OFF. But if the sum current of $I_A$ and $I_B$ is smaller than the predetermined value corresponding to the third threshold value Vth3, the third comparator CMP3 does not send out a signal. This prevents the SLIC from mistaking a small leakage current in the subscriber line for an off-hook state. And, if the voltage corresponding to the sum current of $I_A$ and $I_B$ exceeds the threshold voltage Vth3, the output current of CMP3 runs through the mirror currents M12 and M13. So, scan signals SCNA and SCNB are sent out simultaneously from M12 and M13, indicating that the subscriber line is in an off-hook state.

On the contrary, when the subscriber equipment is in the on-hook state, $I_A$ and $I_B$ are very small. So, all of the voltages input to the comparators become lower than the respective threshold voltages. Then the transistors Q16 and Q17 turn ON, and the output of CMP3 runs through the transistors Q16 and Q17. So, no current runs through M12 and M13. Therefore, no scan signal appears indicating that the subscriber line is in an on-hook state.

If the subscriber line is shortcircuited to ground by a fault, $I_A$ becomes very large and $I_B$ becomes very small, but the sum current of $I_A$ and $I_B$ does not vary so much, and exceeds the threshold Vth3. So, the transistor Q16 becomes OFF and Q17 becomes ON. Accordingly, the output of CMP3 runs through the mirror circuit M12, but the output of CMP3 runs though Q17 and does not run through M13. Therefore, an SCNA signal is generated, but an SCNB signal is not generated indicating that the subscriber line is grounded.

It will be understood that if the subscriber line is shorted to $V_{BB}$, $I_A$ becomes very small, and $I_B$ becomes very large. So, an SCNB signal is generated, but an SCNA signal is not generated, indicating that the subscriber line is short circuited to $V_{BB}$. In such a manner, the situations of off-hook, on-hook or fault short to ground or $V_{BB}$ are discriminated.

Further it is necessary to check the stability of the circuit against noise. If the longitudinal noise is superimposed on the input current, it increases $I_A$ and decreases $I_B$ or vice versa. But, the total current of $I_A$ and $I_B$ is almost kept constant by the adder circuit and stable output is provided from CMP3. Therefore, so long as the noise current is too high to decrease the input voltage of CMP1 or CMP2 to lower than Vth1 or Vth2, the operations of these comparators are secured. As mentioned before, Vth1 and Vth2 are chosen to a low voltage to assure such operation.

In an embodiment, Vth1 and Vth2 were chosen to be −1 volts, and Vth3 was chosen to be −2 volts. The value of resistances, Rc11, Rc12 and Rc13 were 12 kilohms, Rs11, Rs12 were 30 kilohms and Rs13 was 20 kilohms. The constant current sources and the threshold voltage supply sources are conventional ones in the art, and their current handling capacity may be very small (approximately 50 μA for example). So, further description is omitted.

Ground Separation

Generally, an SLIC is operated using various kinds of voltage sources. For example the battery supply circuit is operated by a voltage source between ground G and −48 volts, and logic circuits are operated with a Vcc of +5 volt. $V_{EE}$ of −5 volt and ground E. In the battery feed circuit there are obvious types of noise such as the one induced in the subscriber lines, and a noise generated in the battery source. Though the noise voltage is not so high for the battery source circuit, it is very high for logic circuits, which is operated with a low voltage. So it is necessary to separate these voltage sources from each other in order to assure a stable operation of low voltage circuit, but signals must be transmitted between each circuit. For example, it is necessary to separate the battery source of the battery feed circuit from the voltage source of the logic circuit, but a signal must be transmitted between them. In other words, it is necessary to separate the ground G from the ground E while the circuits are connected to each other.

The present invention intends to transfer a signal current between the systems having different voltage sources. And when a signal is sent from a system having a ground G (abbreviated as system G) to a system having a ground E (abbreviated as system E), for example, it feeds a current from system E to system G having equal amplitude but opposite direction to that of the signal current. By doing so, though signal current flows between the systems G and E, the total current between the two systems is always canceled by the current fed from the system E to G or vice versa. Therefore the total current between the two systems is always zero. This is equivalent to systems G and E that are separate from each other.

Figure 19:
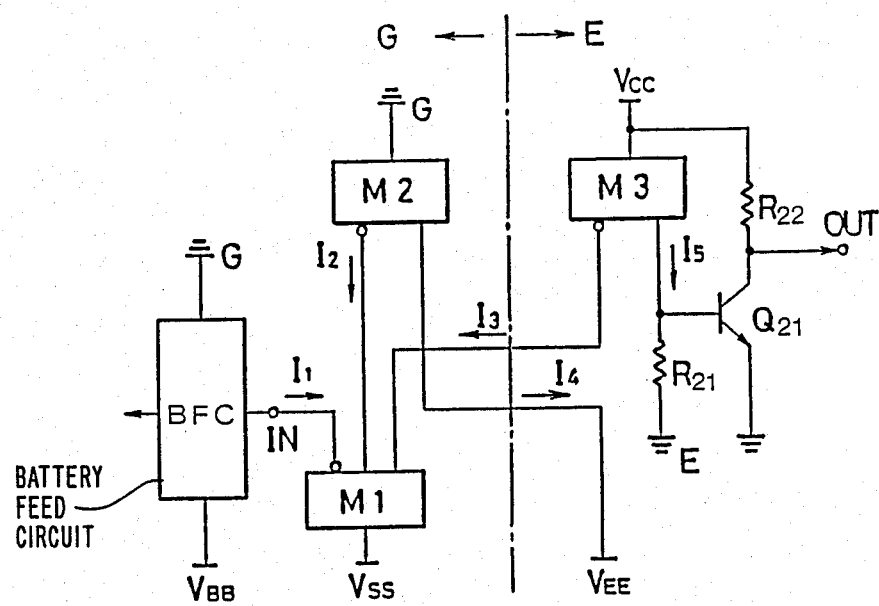
FIG. 19 is a block diagram illustrating ground separation according to the present invention.

FIG. 19 is a block diagram illustrating an operation of the ground separation circuit according to the present invention. The figure illustrates a case when a signal such as an off-hook signal and the like is sent from a subscriber line through a battery feed circuit BFC to a logic circuit (not shown) via the ground separation circuit. The battery feed circuit BFC has a ground G and a voltage source $V_{BB}$ of −48 volts, for example, and the logic circuit is operated by voltage sources Vcc of +5 volts and $V_{EE}$ of −5 volts and has a ground E for example. The figure corresponds to the upper half of FIG. 6.

A common terminal of the mirror circuit M1 is connected to a relatively low voltage source Vss (−5 volts for example) which is generated from $V_{BB}$, so it belongs to the system G. A vertical chained line divides the system E and the system G. A signal current $I_1$, that may be a SCNA signal for example, is fed to the first mirror circuit M1. First and second output terminals of M1 are connected respectively to put terminals of second and third mirror circuits M2 and M3. The output terminal of M2 is connected to the voltage source $V_{EE}$ of the system E. If the input current $I_1$ runs into M1, the same amount of currents $I_2$, $I_3$, $I_4$ and $I_5$ flow in directions as shown by arrows in FIG. 19. If the direction of $I_1$ is reversed, directions of all these currents are reversed. So, the input signal current $I_1$ from the system G is transferred to the system E as a current $I_5$. But since the direction of the currents $I_3$ and $I_4$ are in opposite directions to each other, the total current between the systems G and E is always zero. This is equivalent to two systems which are separate from each other.

Similarly, the signal current from the system G is transferred to the system E as a signal current $I_5$ running out from the third mirror circuit M3. The detector DET in FIG. 6 is composed of the mirror circuit M3, a transistor Q21, and resistors R21, R22. The signal current $I_5$ is converted to a voltage by the resistor R21, detected by a transistor Q21, and taken out from an output terminal OUT. In a similar manner, other signals such as SCNB, 4WS can be transferred from the system G to the system E. In an embodiment R21 and R22 were respectively 50 kilohms and 10 kilohms.

In the above description, signals from the system G to the system E have been explained. But as can be seen in the lower half of FIG. 6, the signals from the system E can be transferred to the system G in a similar manner. Such reverse transfer is applicable for example in a transfer of 4-wire signal to 2-wire signal from the terminal 4WR to terminals A and B in FIG. 7. Since such application will be apparent for one skilled in the art, further description is omitted for the sake of simplicity.

Moreover, the mirror circuits have essentially high impedance characteristics, and their currents are not disturbed by the variation of source voltages $V_{BB}$, $V_{SS}$, $V_{CC}$ and $V_{EE}$, so they separate the G and E systems further from the noise induced in the voltage sources.

Figure 20:
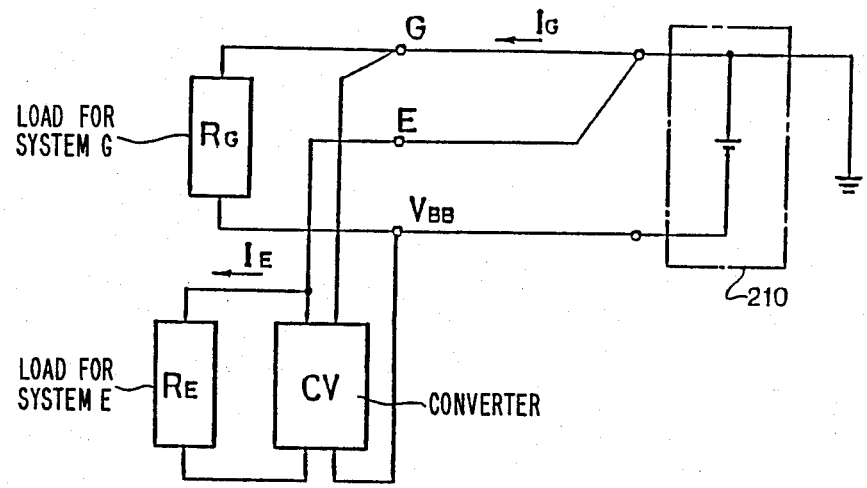
FIG. 20 is a diagram illustrating a voltage supply system for a subscriber line interface circuit.

FIG. 20 illustrates a voltage supply system for a SLIC. A battery (48 volts for example) encircled by a chained line 210 is grounded at its positive terminal. This battery provides the subscriber line current $I_G$ via a battery feed circuit (not shown). Their ground and negative terminals are designated by G and $V_{BB}$, respectively. This system composes the system G and its load is designated by $R_G$. Using the battery 210, a DC to DC converter CV generates a voltage $V_{CC}$ (+5 volts for example) and supplies $I_E$ as the current of the system E. A negative voltage side output of the DC to DC converter CV is grounded by a terminal E. Another voltage source $V_{EE}$ is provided in a similar manner. The DC to DC converter CV generates a constant voltage without being influenced by noise.

Figure 21:
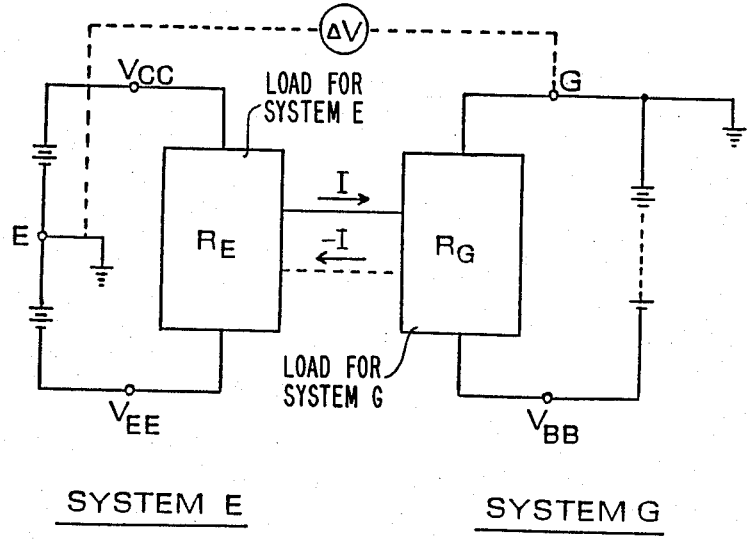
FIG. 21 is a diagram illustrating what occurs between various voltage sources of the subscriber line interface circuit according to the present invention.

The importance of ground separation will be understood from the following consideration. FIG. 21 illustrates what occurs between the voltage sources. The system G is operated by a negative voltage source $V_{BB}$, and the system E is operated by $V_{CC}$ and $V_{EE}$. There is a signal path of current I between the two systems. The system G is grounded at a terminal G, and the systen E is grounded at a terminal E. If the potentials of the points G and E are equal, there is no problem. But it is inevitable to avoid induced noise, especially in the system G which has a long subscriber line, so a voltage difference $\Delta V$ appears between the points G and E. It is equivalent to inserting a generator $\Delta V$ between the points E and G. If the grounds of the system are not separated from each other, this voltage $\Delta V$ or current corresponding to it will appear in both systems. It is especially harmful for the system E which is operated by low voltage, and it causes malfunctions.

But if the ground is separated, in other words, if there is no current flow between the points G and E, even though the voltage difference between the two ground terminals G and E appeared, the circuits of the system G (that is the battery feed circuit etc.) and the circuits of the system E (that is a logic circuit for example) operate normally so long as each respective source voltage is kept constant. Such constant voltage is secured by the battery 210 and the DC to DC converter CV.

As has been described above, and is shown in FIG. 21, the present invention provides another current path between the systems G and E (denoted by a broken line), and a current $-I$ flows which has the same amplitude but opposite direction to the signal current I. So the total current between the two systems is always kept to zero. This is equivalent to points G and E which are separate from each other. This is an inventive ground separation method. In prior art systems such ground separation has been done by using transformers. But is is impossible to fabricate the transformer in an IC circuit, and it is also impossible to transfer a DC signal between the systems. Recently, a photocoupler is beginning to be applied for such purpose, but it is still difficult to fabricate a photo coupler in an IC.

Total Circuit Configuration

Figure 22:
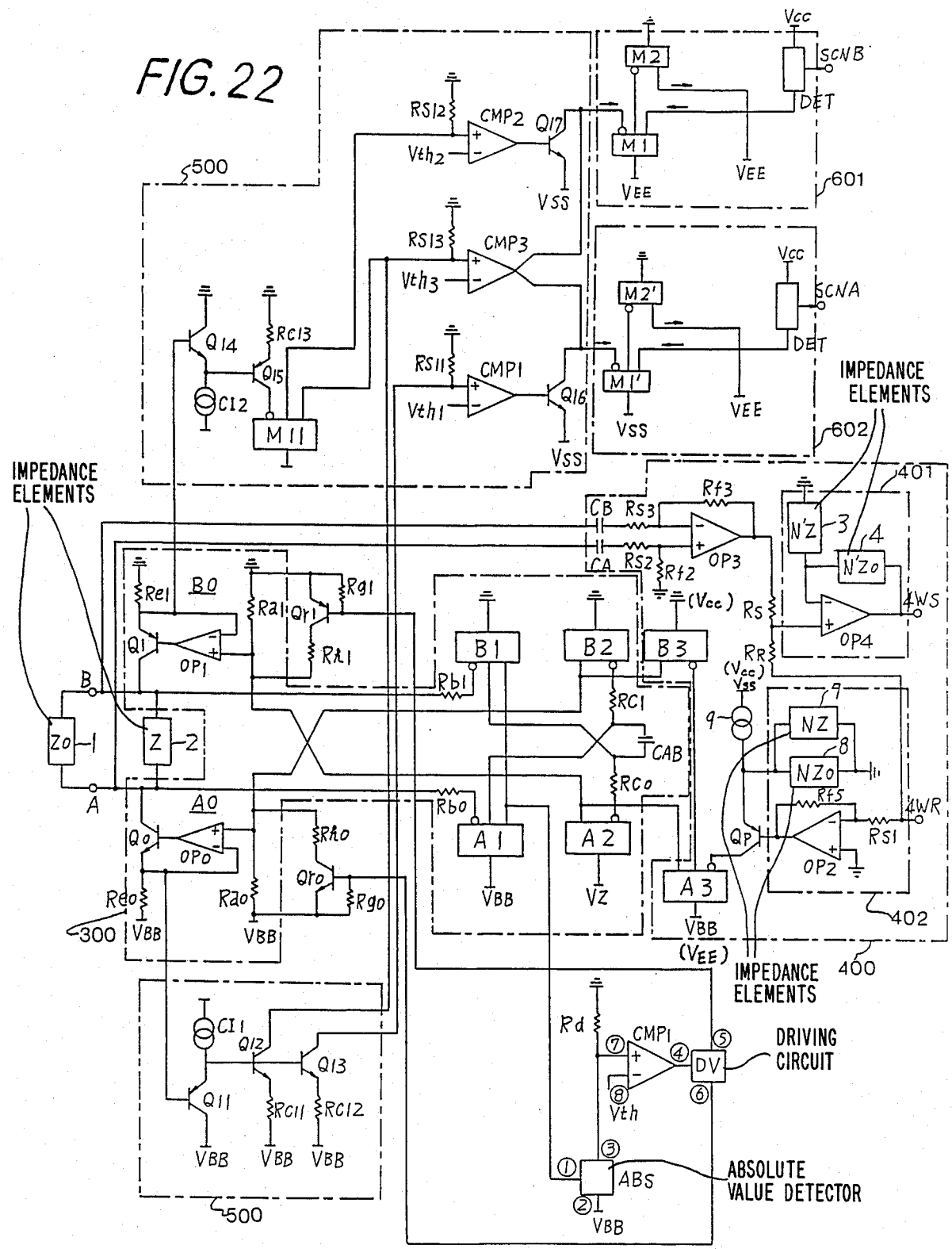
FIG. 22 is a total circuit diagram of the SLIC according to the present invention.

FIG. 22 shows a total circuit diagram of a subscriber line interface circuit according to the present invention. It will be easy to understand for one skilled in the art that the portions encircled by chained lines correspond respectively to the portion shown in FIG. 7. The details of the circuit have been described already with respect to each functional circuit. So, further description of the portions is omitted for the sake of simplicity.

It should be pointed out that the ground separation circuits encircled with chained lines 601 and 602 correspond to upper half of the circuit of FIG. 6. These circuits all transmit the signals (SCNA and SCNB) from left to right in the figure. For the signal of 4WS, the output signal of the 4-wire circuit, however, such ground separation is unnecessary, because the output circuit 401 (corresponds to the system E) is separated from the battery feed circuit (corresponds to the system G) by the capacitors $C_A$ and $C_B$. Therefore, it is unnecessary to worry about the DC voltage difference between the grounds. And as has been described before, the AC voltage difference (that is the longitudinal noise) is eliminated by the differential amplifier OP3 and does not appear in the output.

A circuit corresponding to the lower half of FIG. 6 which transmits a signal from right to left in the figure is used for the input circuit of 4WR which is encircled by a chained line 402. Though it is not shown in the figure in order to avoid complexity, the circuit is inserted between the transistor Qp and the operational amplifier OP2. It will be easy for one skilled in the art to introduce the ground separation circuit of FIG. 6 at this point. Further, it should be pointed out, that if the voltage of the constant current source 9 is supplied from $V_{CC}$, and the supply voltages to the mirror circuits A3 and B3 are replaced by $V_{EE}$ and $V_{CC}$ respectively, it will be clear that these mirror circuits play parts in the lower half of the ground separation circuit of FIG. 6.

The remaining parts of FIG. 22 are similar to those described before, so further description is omitted. The SLIC of the present invention has been designed so as to be fabricated in a monolithic IC, so it is very effective in reducing its size and cost. As has been described above, many modifications of the circuit are possible, but they are all within the scope and spirit of the invention.

What is claimed is:

1. A balanced-type subscriber line interface circuit having a battery feed circuit for supplying DC current from a main voltage source to a two-wire subscriber line having first and second terminals, said subscriber line interface circuit comprising:

first and second feed mirror circuits, having output terminals respectively connected to the first and second terminals for supplying the DC current and having input terminals, said first feed mirror circuit operatively connected to the main voltage source;

a pair of first voltage to current converting means, having input terminals respectively connected to the first and second terminals and having output terminals, for supplyiung first signal currents;

first and second current mirror circuits having input terminals operatively connected to the first and second terminals, respectively, and each having output terminals, said first current mirror circuit operatively connected to the main voltage source;

a capacitor operatively connected between the output terminals of said first and second current mirror circuits;

first and second resistors, having first ends operatively connected to said capacitor and respectively to said second and first current mirror circuits, and having second ends;

third and fourth current mirror circuits having input terminals operatively connected to the second ends of said first and second resistors and output terminals operatively connected to the input terminals of said second and first feed mirror circuits, respectively; and a voltage stabilized source, operatively connected to said third current mirror circuit and isolated from the main voltage source.

2. A subscriber line interface circuit according to claim 1, wherein said subscriber line is connected to a voltage source, and wherein said first and second current feed mirror circuits each comprises:

a voltage follower type first operational amplifier having a non-inverting input terminal, operatively connected to the output terminal of one of said fourth and third mirror circuits, respectively, an inverting input terminal and an output terminal;

a transistor having a collector operatively connected to one of the first and second terminals, respectively, a base operatively connected to the output terminal of said first operational amplifier and an emitter operatively connected to the inverting input terminal of said voltage follower type first operational amplifier; and an input resistor operatively connected between the voltage source and the non-inverting input terminal of said first operational amplifier 3. A subscriber line interface circuit according to claim 1, wherein said pair of first voltage to current converting means comprises third and fourth resistors having first ends operatively connected to the first and second terminals, respectively and second ends operatively connected to the input terminals of said first and second current mirror circuits, respectively.

4. A subscriber line interface circuit according to claim 1, wherein the two-wire subscriber line has a load impedance at the first and second terminals and the battery feed circuit has a termination impedance, and wherein said subscriber line interface circuit further comprises:

a compensation network for compensating frequency characteristics of the two-wire signal generated from the four-wire signal, said compensation network comprising a pair of parallel impedance elements having impedances N times as high as the load impedance of the two-wire subscriber line at the first and second terminals and the termination impedance at the battery feed circuit, respectively, where N is a constant; and a two-wire to four-wire converter for converting between a two-wire signal and a four-wire signal, said two-wire to four-wire converter comprising:

second voltage to current converting means for converting the four-wire signal to a second signal current;

fifth and sixth current mirror circuits, operatively connected to said second voltage to current converting means and said first and second feed mirror circuits, for converting the second signal current into a pair of third signal currents having opposite phases to each other and supplying the pair of third signal currents to the input terminals of said first and second feed mirror circuits;

voltage detecting means for detecting the two-wire signal appearing between the first and second terminals and for producing an output signal including a turn around four-wire input signal; and canceling means for canceling the turn around four-wire input signal in the output signal from said voltage detecting means by adding an opposite phase fourwire input signal to the output signal of said voltage detecting means and for providing a cancelled signal corresponding to the two-wire signal, said canceling means consisting of a sending resistor and a receiving resistor having first ends connected to each other in series, a second end of said sending resistor connected to receive the output signal from said voltage detecting means and a second end of said receiving resistor connected to receive the four-wire signal, the first ends of said sending and receiving resistors providing an output voltage corresponding to the two-wire signal, said sending and receiving resistors having resistances $R_S$ and $R_R$, respectively, determined by $$V_{p3}/R_S = V_{4R}/R_R$$

where $V_{p3}$ and $V_{4R}$ are absolute values of the output voltage of said voltage detection means and the input voltage of the four-wire signal, respectively.

5. A subscriber line interface circuit according to claim 4, wherein said second voltage to current converting means comprises:

a series resistor having a first end for receiving the four-wire signal and having a second end;

a second operational amplifier having an inverting input terminal connected to said series resistor, a noninverting input terminal connected to ground and an output terminal for supplying an amplified output;

a feedback resistor connected between the output terminal and the inverting input terminal of said second operational amplifier;

a transistor, connected to said fifth current mirror circuit and having a control terminal connected to the output terminal of said second operational amplifier, for converting the amplified output of said second operational amplifier to a fourth signal current and supplying the fourth signal current to said fifth current mirror circuit; and a constant current source, connected to said transistor, for supplying a constant current to said transistor.

6. A balanced-type subscriber line interface circuit having a battery feed circuit for supplying DC current to a two-wire subscriber line having first and second terminals, said subscriber line interface circuit comprising:

first and second feed mirror circuits, having output terminals respectively connected to the first and second terminals for supplying the DC current and having input terminals;

a pair of first voltage to current converting means, having input terminals respectively connected to the first and second terminals, for supplying from output terminals first and signal currents with a maximum current level, each of said first voltage to current converting means comprising:

first and second resistors having first ends respectively connected to the input and output terminals of said first voltage to current converting means and having second ends;

a first transistor connected between the first end of said first resistor and the second end of said second resistor, having a control terminal connected to the second end of said first resistor; and a second transistor connected between the first end of said second resistor and the second end of said first resistor, having a control terminal connected to the second end of said second resistor;

first and second current mirror circuits having input terminals operatively connected to the first and second terminals, respectively, and each having output terminals;

a capacitor operatively connected between the output terminals of said first and second current mirror circuits;

third and fourth resistors, having first ends operatively connected to said capacitor and to said second and first current mirror circuits, and having second ends; and third and fourth current mirror circuits having input terminals operatively connected to the second ends of said third and fourth resistors and output terminals operatively connected to the input terminals of said second and first feed mirror circuits, respectively.

7. A balanced-type subscriber line interface circuit, connected to a voltage source, having a battery feed circuit for supplying DC current to a two-wire subscriber line having first and second terminals, said subscriber line interface circuit comprising:

first and second feed mirror circuits, having output terminals respectively connected to the first and second terminals of the two-wire subscriber line for supplying the DC current and having input terminals, each comprising:

a voltage follower type first operational amplifier having a non-inverting input terminal, an inverting input terminal and an output terminal;

a transistor having a collector operatively connected to one of the first and second terminals of the two-wire subscriber line, respectively, a base operatively connected to the output terminal of said first operational amplifier and an emitter operatively connected to the inverting input terminal of said voltage follower type first operational amplifier; and an input resistor operatively connected between the voltage source and the non-inverting input terminal of said first operational amplifier, input currents passing through said input resistor;

a pair of first voltage to current converting means, having input terminals respectively connected to the first and second terminals of the two-wire subscriber line and having output terminals, for supplying first signal currents;

first and second current mirror circuits having input terminals operatively connected to the first and second terminals, respectively, and each having first output terminals;

a capacitor operatively connected between the first output terminals of said first and second current mirror circuits;

first and second resistors, having first ends operatively connected to said capacitor and respectively to said second and first current mirror circuits, and having second ends;

third and fourth current mirror circuits having input terminals operatively connected to the second ends of said first and second resistors and output terminals operatively connected to the non-inverting input terminal of said first operational amplifier in said second and first feed mirror circuits, respectively; and an overcurrent protective circuit, comprising:

a plurality of resistive means for providing a resistance in parallel to said input resistor in said first and second feed mirror circuits in dependence upon a driving signal;

detecting means for detecting a difference between the input currents running through said input resistor in said first and second feed mirror circuits;

comparing means for comparing the difference between the input currents with a predetermined threshold value to generate a comparison signal; and driving means for generating the driving signal for said resistive means in dependence upon the comparison signal.

8. A subscriber line interface circuit according to claim 7, wherein each of said resistive means comprises:

a switching transistor having an emitter connected to the voltage source, a base connected to said driving means, and a collector;

a third resistor having a first end connected to the non-inverting input terminal of said first operational amplifier and a second end connected to said switching transistor; and a fourth resistor connected between the base of said switching transistor and the voltage source.

9. A subscriber line interface circuit according to claim 7, wherein said first and second current mirror circuits have second output terminals connected together, and wherein said detecting means comprises:

a third resistor having a first end connected to the voltage source and having a second end; and an absolute value detector, comprising:
pnp and npn transistors, having emitters connected together and to the second output terminals of said first and second current mirror circuits, bases connected together and collectors, the collector of said npn transistor providing an absolute value signal; and
a fifth current mirror circuit having an input terminal connected to the collector of said pnp transistor and an output terminal connected to the collector of said npn transistor.

10. A balanced-type subscriber line interface circuit having a battery feed circuit for supplying DC current to a two-wire subscriber line having first and second terminals, said subscriber line interface circuit comprising:

first and second feed mirror circuits, having output terminals respectively connected to the first and second terminals for supplying the DC current and having input terminals;

a pair of first voltage to current converting means, having input terminals respectively connected to the first and second terminals and having output terminals, for supplying first signal currents;

first and second current mirror circuits having input terminals operatively connected to the first and second terminals, respectively, and each having output terminals;

a capacitor operatively connected between the output terminals of said first and second current mirror circuits;

first and second resistors, having first ends operatively connected to said capacitor and respectively to said second and first current mirror circutis; and having second ends;

third and fourth current mirror circuits having input terminals operatively connected to the second ends of said first and second resistors and output terminals operatively connected to the input terminals of said second and first feed mirror circuits, respectively;

a two-wire to four-wire converter for converting between a two-wire signal and a four-wire signal, said two-wire to four-wire converter comprising:
second voltage to current converting means for converting the four-wire signal to a second signal current;
fifth and sixth current mirror circuits, operatively connected to said second voltage to current converting means and said first and second feed mirror circuits, for converting the second signal current to a pair of third signal currents having opposite phases to each other and supplying the pair of third signal currents to the input terminals of said first and second feed mirror circuits;
voltage detecting means for detecting the two-wire signal appearing between the first and second terminals and for producing an output signal including a turn around fourwire input signal, comprising:
first and second series capacitors having first ends connected to the first and second terminals, respectively, and having second ends;
first and second series resistors having firt ends connected to the second ends of said first and second series capacitors, respectively, and having second ends;
a second operational amplifier having noninverting and inverting input terminals connected respectively to said first and second series resistors and having an output terminal;
a grounding resistor connected between the noninverting input terminal of said second operational amplifier and ground; and
a feedback resistor connected between the output terminal and the inverting input terminal of said second operational amplifier; and
canceling means for canceling the turn around four-wire input signal in the output signal from said voltage detecting means by adding an opposite phase fourwire input signal to the output signal of said voltage detecting means and for providing a cancelled signal corresponding to the two-wire signal.

11. A balanced-type subscriber line interface circuit having a battery feed circuit for supplying DC current to a two-wire subscriber line having first and second terminals, said subscriber line interface circuit comprising:

first and second feed mirror circuits, having output terminals respectively connected to the first and second terminals for supplying the DC current and having input terminals;

a pair of first voltage to current converting means, having input terminals respectively connected to the first and second terminals and having output terminals, for supplying first signal currents;

first and second current mirror circuits having input terminals operatively connected to the first and second terminals, respectively, and each having output terminals;

a capacitor operatively connected between the output terminals of said first and second current mirror circuits;

first and second resistors, having first ends operatively connected to said capacitor and respectively to said second and first current mirror circuits, and having second ends;

third and fourth current mirror circuits having input terminals operatively connected to the second ends of said first and second resistors and output terminals operatively connected to the input terminals of said second and first feed mirror circuits respectively;

a two-wire to four-wire converter for converting between a two-wire signal and a four-wire signal, said two-wire to four-wire converter comprising:
second voltage to current converting means for converting the four-wire signal to a second signal current;
fifth and sixth current mirror circuits, operatively connected to said second voltage to current converting means and said first and second feed mirror circuits, for converting the second signal current to a pair of third signal currents having opposite phases to each other and supplying the pair of third signal currents to the input terminals of said first and second current feed mirror circuits;
voltage detecting means for detecting the two-wire signal appearing between the first and second terminals and for producing an output signal including a turn around four-wire input signal; and canceling means for canceling the turn around four-wire input signal in the output signal from said voltage detecting means by adding an opposite phase fourwire input signal to the output signal of said voltage detecting means and for providing a cancelled signal corresponding to the two-wire signal, comprising a sending resistor and a receiving resistor having first ends connected to each other in series, a second end of said sending resistor connected to receive the output signal from said voltage detecting means, a second end of said receiving resistor connected to receive the four-wire signal, the first ends of said sending and receiving resistors providing an output voltage corresponding to the two-wire signal, said sending and receiving resistors having resistances $R_S$ and $R_R$, respectively, determined by $$V_{p3}/R_S = V_{4R}/R_R$$

where $V_{p3}$ and $V_{4R}$ are absolute values of the output voltage of said voltage detection means and the input voltage of the four-wire signal, respectively.

12. A balanced-type subscriber line interface circuit having a battery feed circuit for supplying DC current to a two-wire subscriber line having first and second terminals with a load impedance at the first and second terminals, the battery feed circuit having a termination impedance, said subscriber line interface circuit comprising:

first and second feed mirror circuits, having output terminals respectively connected to the first and second terminals for supplying the DC current and having input terminals;

a pair of first voltage to current converting means, having input terminals respectively connected to the first and second terminals and having output terminals, for supplying first signal currents;

first and second current mirror circuits having input terminals operatively connected to the first and second terminals, respectively, and each having output terminals;

a capacitor operatively connected between the output terminals of said first and second current mirror circuits;

first and second resistors, having first ends operatively connected to said capacitor and respectively to said second and first current mirror circuits, and having second ends;

third and fourth current mirror circuits having input terminals operatively connected to the second ends of said first and second resistors and output terminals operatively connected to the input terminals of said second and first feed mirror circuits, respectively;

a two-wire to four-wire converter for converting between a two-wire signal and a four-wire signal, said two-wire to four-wire converter comprising:

second voltage to current converting means for converting the four-wire signal to a second signal current;

fifth and sixth current mirror circuits, operatively connected to said second voltage to current converting means and said first and second current feed mirror circuits, for converting the second signal current to a pair of third signal currents having opposite phases to each other and supplying the pair of third signal currents to the input terminals of said first and second feed mirror circuits;

voltage detecting means for detecting the two-wire signal appearing between the first and second terminals and for producing an output signal including a turn around four-wire input signal; and canceling means for canceling the turn around four-wire input signal in the output signal from said voltage detecting means by adding an opposite phase fourwire input signal to the output signal of said voltage detecting means and for providing a cancelled signal corresponding to the two-wire signal; and a compensation network for compensating frequency characteristics of the two-wire signal generated from the four-wire signal, said compensation network comprising a pair of parallel impedance elements having impedances N times as high as the load impedance of the two-wire subscriber line at the first and second terminals and the termination impedance of the battery feed circuit, respectively, where N is a constant.

13. A subscriber line interface circuit according to claim 12, wherein said second voltage to current converting means comprises:

a series resistor having a first end for receiving the four-wire signal and having a second end;

a second operational amplifier having an inverting input terminal connected to said series resistor, a non-inverting input terminal connected to ground and an output terminal for supplying an amplified output;

a feedback resistor connected between the output and inverting input terminals of said second operational amplifier;

a transistor, connected to said fifth current mirror circuit and having a control terminal connected to the output terminal of said second operational amplifier, for converting the amplified output of said second operational amplifier into a fourth signal current and supplying the fourth signal current to said fifth current mirror circuit; and a constant current source connected to said transistor, for supplying a constant current to said transistor; and wherein said compensation network is connected between said constant current source and ground.

14. A balanced-type subscriber line interface circuit having a battery feed circuit for supplying DC current to a two-wire subscriber line having first and second terminals with a load impedance at the first and second terminals, the battery feed circuit having a termination impedance, said subscriber line interface circuit comprising:

first and second feed mirror circuits, having output terminals respectively connected to the first and second terminals for supplying the DC current and having input terminals;

a pair of first voltage to current converting means, having input terminals respectively connected to the first and second terminals and having output terminals, for supplying first signal currents;

first and second current mirror circuits having input terminals operatively connected to the first and second terminals, respectively, and each having output terminals;

a capacitor operatively connected between the output terminals of said first and second current mirror circuits;

first and second resistors, having first ends operatively connected to said capacitor and respectively to said second and first current mirror circuits, and having second ends;

third and fourth current mirror circuits having input terminals operatively connected to the second ends of said first and second resistors and output terminals operatively connected to the input terminals of said second and first feed mirror circuits respectively;

a two-wire to four-wire converter for converting between a two-wire signal and a four-wire signal, said two-wire to four-wire converter comprising:

second voltage to current converting means for converting the four-wire signal to a second signal current;

fifth and sixth current mirror circuits, operatively connected to said second voltage to current converting means and said first and second feed mirror circuits, for converting the second signal current to a pair of third signal currents having opposite phases to each other and supplying the pair of third signal currents to the input terminals of said first and second feed mirror circuits;

voltage detecting means for detecting the two-wire signal appearing between the first and second terminals and for producing an output signal including a turn around four-wire input signal; and canceling means for canceling the turn around four-wire input signal in the output signal from said voltage detecting means by adding an opposite phase four-wire input signal to the output signal of said voltage detecting means and for providing a cancelled signal corresponding to the two-wire signal; and a compensation network for compensating frequency characteristics of the four-wire signal generated from the two-wire signal, said compensation network comprising:

an operational amplifier having a noninverting input terminal connected to receive the cancelled signal from said canceling means and having an inverting input terminal and an output terminal;

a first impedance element having an impedance N times as high as that of the termination impedance, said first impedance element operatively connected between the inverting input terminal of said operational amplifier and ground; and a second impedance element having an impedance N times as high as that of the load impedance, said second impedance element operatively connected between the output terminal and the inverting input terminal of said operational amplifier, where N is a constant.

15. A subscriber line interface circuit according to claim 14, wherein said second compensation network further comprises:

a feedback resistor connected between the output terminal of said operational amplifier and said second impedance element, forming a junction point with said second impedance element; and a series resistor connected between ground and the junction point of the second impedance element and the feedback resistor.

16. A balanced-type subscriber line interface circuit having a battery feed circuit for supplying DC current to a two-wire subscriber line having first and second terminals, said subscriber line interface circuit comprising:

first and second feed mirror circuits, having output terminals respectively connected to the first and second terminals for supplying the DC current and having input terminals;

a pair of first voltage to current converting means, having input terminals respectively connected to the first and second terminals and having output terminals, for supplying first signal currents;

first and second current mirror circuits having input terminals operatively connected to the first and second terminals, respectively, and each having output terminals;

a capacitor operatively connected between the output terminals of said first and second current mirror circuits;

first and second resistors, having first ends operatively connected respectively to said capacitor and to said second and first current mirror circuits, and having second ends;

third and fourth current mirror circuits having input terminals operatively connected to the second ends of said first and second resistors and output terminals operatively connected to the input terminals of said second and first feed mirror circuits, respectively; and a supervision circuit for generating signals indicating conditions on the two-wire subscriber line including on-hook, off-hook, short circuited to ground and short circuited to a voltage source, said supervision circuit comprising:

first and second current detecting means for respectively detecting values of currents passing through each of the first and second terminals;

first and second comparing circuits, operatively connected to said first and second current detecting means, respectively, for comparing the values detected by said first and second current detecting means with first and second threshold values, respectively;

a third comparing circuit, operatively connected to said first and second current detecting means, for comparing a sum of the values detected by said first and second current detecting means with a third threshold value; and first and second AND gates, operatively connected to said first and second comparing circuits, respectively, and to said third comparing circuit, having output terminals for respectively providing first and second scan signals, respectively.

17. A subscriber line interface circuit according to claim 16, wherein said subscriber line interface circuit is operatively connected to a voltage source, and wherein said first and second current detecting means each comprises a resistor connected between the voltage source and said first and second feed mirror circuits, respectively.

18. A subscriber line interface circuit according to claim 16, wherein said third comparing circuit comprises a wired OR circuit operatively connected to said first and second current detecting means.

19. A subscriber line interface circuit according to claim 16, further comprising ground separation circuits, operatively connected to each of the output terminals of said first and second AND gates, each of said separation circuits comprising:
   a sending mirror circuit having an input terminal operatively connected to receive a corresponding scan signal and first and second output terminals each for outputting a second signal current in dependence upon the corresponding scan signal; and
   a compensating mirror circuit having an input terminal operatively connected to receive the second signal current from the second output terminal of said sending mirror circuit and an output terminal for producing a third signal current equal in amplitude but opposite in phase to the second signal current output at the first output terminal of said sending mirror circuit.

20. A balanced-type subscriber line interface circuit having a battery feed circuit with a first ground and a logic circuit with a second ground, the battery feed circuit supplying DC current to a two-wire subscriber line having first and second terminals, said subscriber line interface circuit comprising:
   first and second feed mirror circuits, having output terminals respectively connected to the first and second terminals for supplying the DC current and having input terminals;
   a pair of first voltage to current converting means, having input terminals respectively connected to the first and second terminals and having output terminals, for supplying first signal currents;
   first and second current mirror circuits having input terminals operatively connected to the first and second terminals, respectively, and each having output terminals;
   a capacitor operatively connected between the output terminals of said first and second current mirror circuits;
   first and second resistors, having first ends operatively connected to said capacitor and respectively to said second and first current mirror circuits, and having second ends;
   third and fourth current mirror circuits having input terminals operatively connected to the second ends of said first and second resistors and output terminals operatively connected to the input terminals of said second and first feed mirror circuits, respectively; and
   a ground separation circuit, operatively connected to the battery feed circuit, for transferring a signal between the battery feed circuit and the logic circuit, said ground separation circuit producing a second signal current, in dependence upon an input signal from one of the battery feed and logic circuits on a first current path between the battery feed circuit and the logic circuit and simultaneously said ground sepration circuit producing a third signal current, equal in amplitude but opposite in phase to the second signal current, on a second current path between the battery feed and logic circuits.

21. A subscriber line interface circuit according to claim 20, wherein said ground separation circuit comprises:
   a sending mirror circuit in one of the battery feed and logic circuits, having an input terminal operatively connected to receive the input signal and first and second output terminals each outputting the second signal current, the first output terminal being operatively connected to said other of the battery feed and logic circuits; and
   a compensating mirror circuit having an input terminal operatively connected to receive the second signal current from the second output terminal of said sending mirror circuit and an output terminal, operatively connected to said other of the battery feed and logic circuits, for producing the third signal current.

22. A subscriber line interface circuit according to claim 21, further comprising current detecting means in said other of the battery feed circuit and the logic circuit, operatively connected to said ground separation circuit, for detecting the second signal current sent between the battery feed and logic circuits and providing an output signal corresponding to the second signal current.

* * * * *